(12) United States Patent
Maekawa et al.

(10) Patent No.: US 7,675,210 B2
(45) Date of Patent: Mar. 9, 2010

(54) HYDRODYNAMIC BEARING AND METHOD FOR MANUFACTURING THE SAME, AND SPINDLE MOTOR AND METHOD FOR MANUFACTURING THE SAME

(75) Inventors: Kazunori Maekawa, Ozu (JP); Yosei Yoshikawa, Tohon (JP); Naoshi Kainoh, Ozu (JP); Junichi Nakamura, Ozu (JP); Akihito Shirai, Ozu (JP)

(73) Assignee: Panasonic Corporation, Osaka (JP)

( * ) Notice: Subject to any disclaimer, the term of this patent is extended or adjusted under 35 U.S.C. 154(b) by 899 days.

(21) Appl. No.: 11/369,879

(22) Filed: Mar. 8, 2006

(65) Prior Publication Data
US 2006/0202577 A1 Sep. 14, 2006

(30) Foreign Application Priority Data
Mar. 11, 2005 (JP) ............................. 2005-069162
Sep. 27, 2005 (JP) ............................. 2005-279705

(51) Int. Cl.
*H02K 7/14* (2006.01)
*G11B 17/038* (2006.01)

(52) U.S. Cl. .................... 310/90; 310/67 R; 360/98.07; 360/99.08

(58) Field of Classification Search ............... 310/67 R, 310/90; 360/98.07, 99.05, 99.08, 99.12; G9B/17.012, 19.028
See application file for complete search history.

(56) References Cited

U.S. PATENT DOCUMENTS

| 4,795,275 | A | | 1/1989 | Titcomb et al. |
| 5,529,404 | A | * | 6/1996 | Robinson et al. ............ 384/617 |
| 5,744,882 | A | * | 4/1998 | Teshima et al. ........... 310/67 R |
| 6,671,125 | B1 | * | 12/2003 | Sumi ........................ 360/99.08 |
| 6,717,310 | B2 | * | 4/2004 | Yoshikawa et al. ............ 310/90 |
| 2002/0185925 | A1 | | 12/2002 | Yoshikawa et al. |
| 2003/0133633 | A1 | | 7/2003 | Nakamura |

FOREIGN PATENT DOCUMENTS

| CN | 1388871 | | 1/2003 |
| JP | 62071574 A | * | 4/1987 |
| JP | 6-21348 | | 3/1994 |
| JP | 6-54916 | | 7/1994 |
| JP | 2002-70849 | | 3/2002 |
| JP | 3282945 | | 5/2002 |
| JP | 2002-369438 | | 12/2002 |

* cited by examiner

*Primary Examiner*—Tran N Nguyen
(74) *Attorney, Agent, or Firm*—Wenderoth, Lind & Ponack L.L.P.

(57) ABSTRACT

The object of the present invention is to provide a hydrodynamic bearing, a method for manufacturing the same, and a spindle motor, with which the gap in the axial direction required for the smooth operation of a bearing can be sufficiently ensured. A method for manufacturing a hydrodynamic bearing comprising a shaft, a sleeve attached so as to be capable of relative rotation with respect to the shaft, a first flange unit 6 fixed to or integrated with the shaft, and a second flange unit fixed to the shaft, the method comprising at least inserting the shaft into the sleeve, and inserting the shaft into the second flange unit, pressing the top face of the second flange unit in the axial direction, and fixing the second flange unit to the shaft by welding the shaft and the second flange unit while maintaining the pressing state.

4 Claims, 17 Drawing Sheets

Laser welding position

Prior Art

Prior Art

HYDRODYNAMIC BEARING AND METHOD FOR MANUFACTURING THE SAME, AND SPINDLE MOTOR AND METHOD FOR MANUFACTURING THE SAME

BACKGROUND OF THE INVENTION

1. Field of the Invention

The present invention relates to a hydrodynamic bearing used in a spindle motor or the like, to a method for manufacturing the bearing, to a spindle motor, and to a method for manufacturing the motor.

2. Description of the Related Art

The spindle motors installed in disk drives such as hard disk drives (hereinafter referred to as HDDs) have in recent years been hydrodynamic bearing motors, which involve non-contact rotation and therefore afford reductions in noise and NRRO.

As to the structure of these hydrodynamic bearing motors, FIG. 9 shows a conventional hydrodynamic bearing (see Japanese Utility Model Publication No. 2,525,216, for example), which comprises a shaft 103, a tapered portion 106, a sleeve 112, and a tapered bearing shell 108. The units on the shaft 103 side are fixed by a screw cramp. In this example, the tapered portion 106 is fitted to the shaft 103 having a similar tapered portion 104 that combines a radial bearing with a thrust bearing, and these are fixed with a threaded cover 114. The tapered bearing shell 108 is fitted to the sleeve 112. The space between the tapered portion of the shaft 103 and the tapered bearing shell is filled with a lubricating fluid.

In manufacturing a hydrodynamic bearing such as this, the required strength is achieved and the size of the product is reduced by fastening the above-mentioned units together by press-fitting, using an adhesive, or the like. Specific examples of fastening methods that have been used include shrink fitting and using an adhesive agent. All of these methods, however, entail problems; for example, there is dimensional change in the units, or the adhesive works its way into the parts and lowers the ultimate performance of the bearing.

Accordingly, in more recent hydrodynamic bearings (see Japanese Unexamined Patent Publication No. 2002-070849, for example), a large-diameter unit (first flange unit) 6 is formed as a first sealing unit integrally with part of a shaft 7, this is inserted into a sleeve 8, and a second flange unit 9 is press-fitted as a second sealing unit while a specific thrust gap is maintained (see FIG. 2, for example). FIG. 2 is actually a diagram of the structure of the hydrodynamic bearing pertaining to the present invention, but is used here for the sake of describing the structure of a conventional hydrodynamic bearing. However, even with this structure, when the second flange unit 9 is press-fitted to the shaft 7, the press-fitting produces burrs, and these burrs can find their way into the bearing parts and diminish the performance of the bearing, although the incidence of this problem is lower here. It is because of this that welding is the most commonly used method, since it does not produce any burrs (see Japanese Unexamined Patent Publication No. 2002-369438, for example).

Also, HDDs need to be even thinner and more compact. To reduce the size and thickness of a HDD, the spindle motor that rotates the disk must be made smaller and thinner. FIG. 13 is a cross-sectional view of a spindle motor in a conventional example (see Japanese Patent No. 3,282,945).

In FIG. 13, a sleeve 33 is provided in the middle of a housing 31, and a shaft 34 is inserted rotatably in a bearing hole of the sleeve 33. The sleeve 33, the shaft 34, and a thrust plate 35 constitute a hydrodynamic bearing that is known in this field of technology, and the shaft 34 and the sleeve 33 rotate in a non-contact manner. A rotor hub 32 is attached to the shaft 34. A magnet 36 is attached to the inner periphery of the rotor hub 32, and a magnetic disk 39 is attached to the outer periphery. The shaft 34 has a threaded hole 43, and a clamp screw 42 for fixing a clamping unit 41 is threaded into the threaded hole 43. The clamping unit 41 serves to hold the magnetic disk 39 in place. The magnet 36 rotates the rotor hub 32 and the shaft 34 upon receiving drive force from a stator core 37 fixed to the housing 31.

With the above spindle motor, the rotor hub 32 must be tightly attached to the shaft 34. With a typical attachment method, the shaft 34 is press-fitted in the hole of the rotor hub 32. However, since the inside diameter of the hole of the rotor hub 32 and the outside diameter of the shaft 34 may include a certain amount of production error, press-fitting alone does not always provide a secure and tight attachment. In view of this, the shaft 34 is press-fitted into the hole of the rotor hub 32 and the two are welded together, which affords a tighter and more secure attachment. The method for attaching the rotor hub 32 and the shaft 34 will be described through reference to FIG. 14.

FIG. 14a is a detailed cross-sectional view of the main components, and shows a first method for attaching the rotor hub 32 and the shaft 34. A rounded portion 44 or an inside-chamfered portion 45 has been formed on the square edge of the top face of the shaft 34. The inside diameter of the hole in the rotor hub 32 is slightly smaller than the outside diameter of the shaft 34, and when the shaft 34 is press-fitted into the hole of the rotor hub 32, the two are fixed by this tight fit. Next, a V-shaped concave part 46 formed with the rounded portion 44 and the inside-chamfered portion 45 is irradiated with a laser beam, which melts the shaft 34 and the rotor hub 32 near the concave part 46 and laser welds the two.

FIG. 14b is a detailed cross-sectional view of the main components, and shows a second method for attaching the rotor hub 32 and the shaft 34. First, a concave part 47 is formed around the hole of the rotor hub 32 so that the top part 34a of the shaft 34 sticks out. When the rotor hub 32 is attached to the shaft 34, the shaft 34 is press-fitted in the hole of the rotor hub 32, after which the square edge 48 is irradiated with a laser beam to laser weld the units.

With both of the above methods, the rotor hub 32 is fixed to the shaft 34 by press-fitting and laser welding, so a high fixing strength is obtained.

Nevertheless, the following problems are still encountered with the above conventional structures and methods.

When units are welded together, the solidification of the welds is accompanied by a change in the shrinkage stress of the units, which is a problem in that the specified dimensions of the units cannot be ensured. In particular, when the shaft and the flange that constitute the thrust bearing portion are welded, as disclosed in Japanese Unexamined Patent Publication No. 2002-369438, the welding causes the flange to move in the axial direction, and the heat imparted during welding also makes the flange warp in the vertical direction. Consequently, a problem is that the gap in the axial direction that is required with a thrust bearing cannot be ensured.

Also, with the first attachment method, when the rotor hub 32 and the shaft 34 are welded with a laser beam near the concave part 46, microcracks about 1 to 2 μm long and 1 to 1.5 μm deep develop in the surface of the welds. These microcracks contain tiny metal particles that cannot be readily removed by ordinary cleaning treatments. These tiny metal particles fly out of the microcracks as a result of vibration and so forth during operation of the spindle motor, stick to the surface of the magnetic disk, and adversely affect the recording or reproduction of data by the magnetic head. Also, welding fumes generated during laser welding (composed of an oxide micropowder produced from high-temperature metal during welding) may enter the threaded hole 43 and may cause contamination in the motor when assembling the HDD.

With the second attachment method, the flange can be prevented from going into the threaded hole 43 if the depth L of the concave part 47 and the length L that the top part 34a of the shaft 34 sticks out are increased. However, because the thickness of a spindle motor is restricted, if the length L (see FIG. 14b) of the top part 34a of the shaft 34 is too long, a fastening power between the shaft 34 and the rotor hub 32 gets decreased, and enough resistance to shock between them cannot be obtained. To prevent the problem, it is preferable also to minimize the length L. If the length L is decreased, though, welding fumes will be more apt to find their way into the threaded hole 43. Since the generation of microcracks is unavoidable, the same problems are encountered as with the first method.

SUMMARY OF THE INVENTION

In view of the above, it is an object of the present invention to provide a hydrodynamic bearing and a method for manufacturing the bearing, and a spindle motor and a method for manufacturing the motor, with which the above problems can be solved.

The method pertaining to the first invention is a method for manufacturing a hydrodynamic bearing comprising a shaft, a sleeve, a first flange unit, and a second flange unit, the method comprising inserting the shaft into the sleeve, and inserting the shaft into the second flange unit, pressing the top face of the second flange unit in the axial direction, and fixing the second flange unit to the shaft by welding the shaft and the second flange unit while keeping pressing the top face of the second flange unit. The sleeve here is attached so as to be capable of relative rotation with respect to the shaft. The first flange unit is fixed to or integrated with the shaft. The second flange unit is fixed to the shaft.

What is indicated here is a method for manufacturing a hydrodynamic bearing in which the top face of the second flange unit is pressed in the axial direction in the course of welding the second flange unit and the shaft.

Laser welding is usually used as the method for fixing the second flange unit to the shaft. Laser welding was introduced to eliminate the drawbacks to conventional methods in which a unit is fastened by press-fitting or the use of an adhesive agent or the like, and an advantage of this method is that there is less decrease in the ultimate performance of the hydrodynamic bearing than with conventional methods. Nevertheless, a problem is that the welding causes the second flange unit to move in the axial direction, and the heat imparted during welding results in distortion in the form of vertical warping, so the specified gap in the axial direction cannot be sufficiently maintained. A lubricating fluid is injected into the gap in the axial direction, and allows the smooth operation of a hydrodynamic bearing that rotates in non-contact. Accordingly, the units cannot be manufactured in their specified dimensions, and this in turn lowers the performance of the hydrodynamic bearing.

In view of this, with the method for manufacturing a hydrodynamic bearing in this application, the top face of the second flange unit is pressed in the axial direction during welding. The pressed location may be the top face of the second flange unit in the axial direction in order to fix the second flange unit and suppress distortion. When the shrinkage stress at the welding location is taken into account, it is particularly favorable to press on the outer peripheral side of the top face.

This prevents movement and distortion of the second flange unit, so when welding is performed, the specified gap in the axial direction can be sufficiently ensured, and a hydrodynamic bearing can be manufactured with good precision. Therefore, the desired performance of the hydrodynamic bearing can be ensured.

The method pertaining to the second invention is the method for manufacturing a hydrodynamic bearing pertaining to the first invention, further comprising, coating the welded portion with an adhesive resin.

What is indicated here is a step after fixing the second flange unit to the shaft.

At the welded portion, microcracks are produced, and metal microparticles can fly out of the microcracks and lower the performance of the spindle motor.

In view of this, by coating the welded portion with an adhesive resin after the welding, the resin covers the microcracks and prevents the metal microparticles from flying out of the microcracks.

Therefore, the desired performance of the hydrodynamic bearing can be ensured.

The method pertaining to the third invention is the method for manufacturing a hydrodynamic bearing pertaining to the first or the second invention, wherein, while pressing the top face of the second flange unit in the axial direction, the top face of the shaft is also pressed in the axial direction.

What is indicated here is a method for manufacturing a hydrodynamic bearing in which not only the second flange unit, but also the top face of the shaft is pressed in the axial direction in the course of welding the second flange unit and the shaft.

Another problem encountered during welding is that the effect of shrinkage stress at the weld sites further raises the shaft. This again, just as above, means that the specified gap in the axial direction cannot be sufficiently ensured. Accordingly, units cannot be manufactured in their intended sizes, and this in turn diminishes the performance of the hydrodynamic bearing.

In view of this, the top face of the shaft in the axial direction is also pressed at the same during welding to fix the shaft.

This prevents the shaft from rising, so when welding is employed, it is possible to manufacture a hydrodynamic bearing with good precision while ensuring the specified gap in the axial direction. Therefore, the performance of the hydrodynamic bearing can be better ensured.

The method pertaining to the fourth invention is the method for manufacturing a hydrodynamic bearing pertaining to the third invention, wherein the shaft has a threaded hole in its end face, and while pressing the top face of the second flange unit in the axial direction, the top face of the shaft is pressed in the axial direction while the threaded hole is blocked off.

What is indicated here is a method for manufacturing a hydrodynamic bearing in which the top face of the shaft is simultaneously pressed, in a state in which the threaded hole of the shaft is blocked off, in the course of welding the second flange unit and the shaft.

A hydrodynamic bearing is usually structured such that a threaded hole for fixing a cover that covers the upper side of the spindle motor is provided to the shaft such that the hole opens on the top face in the axial direction. With a structure such as this, in addition to the above-mentioned movement and distortion of the second flange unit and the rise of the shaft, another problem is that spatter and other such welding fumes are scattered during welding and find their way into the threaded hole. Consequently, the ultimate manufacturing precision of the hydrodynamic bearing ends up being decreased.

In view of this, with the manufacturing method of the present invention, the threaded hole in the shaft is blocked off during the pressing of the top face of the shaft.

This prevents welding fumes from scattering and minimizes the decrease in the manufacturing precision of the hydrodynamic bearing.

The method pertaining to the fifth invention is the method for manufacturing a hydrodynamic bearing pertaining to any of the first to fourth inventions, wherein while pressing the top face of the second flange unit in the axial direction, a holding jig is used to press the top face of the shaft in the axial direction.

What is indicated here is a unit for pressing on the top face of the shaft in the axial direction.

This holding jig may have a shape that allows the pressing force to be uniformly transferred to the shaft.

This allows the top face of the shaft to be pressed with good precision.

The method pertaining to the sixth invention is the method for manufacturing a hydrodynamic bearing pertaining to the fifth invention, wherein the holding jig has elasticity.

What is indicated here is that the holding jig is an object that has elasticity.

The holding jig can be made of a hard rubber, for example.

This allows the pressing force to be imparted uniformly, so the top face of the shaft can be pressed with good precision.

The method pertaining to the seventh invention is the method for manufacturing a hydrodynamic bearing pertaining to the fifth or sixth invention, wherein the holding jig has a spherical shape at its distal end.

What is indicated here is that the distal end is spherical in shape, as an example of the shape of the holding jig.

The shape of the holding jig is preferably one that will not scratch the top face of the shaft in the axial direction.

In view of this, the distal end of the holding jig, that is, the part that comes into contact with the top face of the shaft in the axial direction, is spherical in shape.

This allows the top face of the shaft to be pressed with good precision without being scratched.

The method pertaining to the eighth invention is the method for manufacturing a hydrodynamic bearing pertaining to any of the first to seventh inventions, wherein the first flange unit is fixed to the shaft by welding.

What is indicated here is a method for fixing the first flange unit to the shaft.

The first flange unit is sometimes molded integrally with the shaft, and sometimes fixed to the shaft. Press-fitting and adhesion are generally employed when fixing is involved. A problem, however, is that burrs are produced in press-fitting, which can affect the manufacture of a hydrodynamic bearing.

In view of this, when fixing is involved, welding is employed just as when the first flange unit is formed by being welded to the shaft.

This allows a hydrodynamic bearing to be manufactured with good precision and without producing any burrs.

The welding method may be laser welding, for example.

The method pertaining to the ninth invention is method for manufacturing a hydrodynamic bearing pertaining to any of the first to eighth inventions, wherein the second flange unit has a concave part on the inner peripheral side of the top face in the axial direction, and while fixing the second flange unit to the shaft by welding the shaft and the second flange unit, the welding is performed near the boundary between the concave part and the shaft.

What is indicated here is a structure in which a concave part is provided to the top face of the second flange unit.

Usually, in welding the second flange unit and the shaft, the welding site is near the upper tangent of the flange unit and the shaft. Nevertheless, if nothing else is done, welding fumes and so forth may scatter during welding and affect the manufacturing precision of other units. This means that the ultimate manufacturing precision of the hydrodynamic bearing ends up being diminished.

In view of this, a concave part is provided to the second flange unit on the inner peripheral side of the top face in the axial direction, and welding is performed near the boundary between the bottom of the concave part and the shaft. Any welding fumes produced in this welding will stay in the concave part.

This prevents welding fumes from scattering and minimizes the decrease in the manufacturing precision of the hydrodynamic bearing.

The hydrodynamic bearing pertaining to the tenth invention comprises at least a shaft, a sleeve, a first flange unit, and a second flange unit. The sleeve is attached so as to be capable of relative rotation with respect to the shaft. The first flange unit is fixed to or integrated with the shaft. The second flange unit is fixed to the shaft. Also, the portion that is welded to fix the second flange unit to the shaft is coated with an adhesive resin.

What is indicated here is an example of a basic structure of the hydrodynamic bearing of the present invention.

The portion that is welded to fix the second flange unit to the shaft is coated with an adhesive resin, for preventing the metal microparticles from flying out of the microcracks.

This reduces the metal microparticles from flying, and the desired performance of the hydrodynamic bearing can be ensured.

The hydrodynamic bearing pertaining to the eleventh invention is the hydrodynamic bearing pertaining to the tenth invention, the second flange unit further has a concave part on the inner peripheral side of the top face in the axial direction. The welded portion is near a boundary of a bottom face of the concave part and the shaft.

What is indicated here is the basic structure of the hydrodynamic bearing of the present invention, and an example of the shape pertaining to the second flange unit, in which a concave part is provided on the inner peripheral side of the top face in the axial direction.

Usually, in welding the second flange unit and the shaft, the welding site is near the upper tangent of the flange unit and the shaft. Nevertheless, if nothing else is done, welding fumes and so forth may scatter during welding and affect the manufacturing precision of other units. This means that the ultimate manufacturing precision of the hydrodynamic bearing ends up being diminished.

In view of this, a concave part is provided on the inner peripheral side of the top face in the axial direction, and welding is performed near the boundary between the bottom of the concave part and the shaft. Then, any welding fumes produced in this welding will stay in the concave part.

Also, by coating near the welded portion with a resin, the resin covers the microcracks and can prevent the metal microparticles from flying out of the microcracks.

This prevents welding fumes from scattering and minimizes the decrease in the manufacturing precision of the hydrodynamic bearing.

The hydrodynamic bearing pertaining to the twelfth invention is the hydrodynamic bearing pertaining to the eleventh invention, wherein the second flange unit further has a concave part on the inner peripheral side of the top face in the axial direction.

What is indicated here is that the second flange unit has a concave part on its bottom face as well.

Usually, when a hydrodynamic bearing is operated, bubbles are produced from the lubricating fluid injected into the gaps between units, and these bubbles can impede the smooth operation of the hydrodynamic bearing.

In view of this, a concave part is provided on the inner peripheral side of the bottom face in the axial direction, which is not used in laser welding, and this concave part serves as a bubble escape portion.

This allows bubbles to flow into the concave part, and a hydrodynamic bearing capable of sustained smooth operation can be obtained.

The hydrodynamic bearing pertaining to the thirteenth invention comprises at least a shaft, a sleeve, a first flange unit, a second flange unit, and at least a first sealing or a second sealing unit. The sleeve is attached so as to be capable of relative rotation with respect to the shaft. The first flange unit is fixed to or integrated with the shaft. The second flange unit is fixed to the shaft. The hydrodynamic bearing of this invention also comprises a first sealing unit and/or a second sealing unit. The first sealing unit is fixed to the sleeve so as to cover the bottom face of the first flange unit in the axial direction, or the second sealing unit is fixed to the sleeve so as to cover the top face of the second flange unit in the axial direction.

What is indicated here is a structure in which a sealing unit is provided covering a flange unit.

A lubricating fluid is injected into the gaps between the flange units and the sleeve. Foreign matter can find its way into these gaps from the bottom face in the axial direction, or the lubricating fluid may leak out from these gaps. Foreign matter may also find its way in from the top face. As a result, the smooth operation of the hydrodynamic bearing is impeded.

In view of this, a sealing unit that has the role of a cover is formed by being fixed to the shaft in a shape that will cover the flange unit. Since they are intended to cover the gaps between the flange units and the sleeve, the sealing units at least span the outer peripheral sides of the flange units in the axial direction.

This prevents contamination by foreign matter and the leakage of the lubricating fluid, and gives a hydrodynamic bearing capable of sustained smooth operation.

The spindle motor pertaining to the fourteenth invention comprises at least the hydrodynamic bearing pertaining to any of the ninth to thirteenth inventions, a hub, a magnet, a base plate, and a stator core. The hub is fixed to the hydrodynamic bearing and allows the hydrodynamic bearing to rotate. The magnet is fixed to the hub. The base plate fixes the hydrodynamic bearing. The stator core is fixed to the base plate so as to be across from the magnet.

What is indicated here is the basic structure of a spindle motor in which the hydrodynamic bearing of this application is employed.

A spindle motor usually makes use of a hydrodynamic bearing. Since hydrodynamic bearings involve non-contact rotation and therefore afford reductions in noise and NRRO, the performance of the bearing affects the performance of the spindle motor. Accordingly, the hydrodynamic bearing must be accurately manufactured to the required dimensions, and must have good precision.

Use of the hydrodynamic bearing of this application affords stable bearing performance. With this hydrodynamic bearing, a concave part is provided on the inner peripheral side of the top face of the second flange unit in the axial direction. The area near the tangent of the shaft and the bottom corner of this concave part is welded, which allows welding fumes to be kept inside the concave part and yields a hydrodynamic bearing with better operating performance. Also, a bubble escape portion may be formed in this hydrodynamic bearing by providing a concave part on the inner peripheral side of the bottom face in the axial direction, which is not used in laser welding.

As a result, any bubbles will flow into the concave part, and a hydrodynamic bearing capable of sustained smooth operation will be obtained, so a spindle motor with better operating performance can be obtained.

The spindle motor pertaining to the fifteenth invention comprises at least the hydrodynamic bearing pertaining to any of the ninth to thirteenth inventions, a hub, a magnet, a base plate, and a stator core. The hub is fixed to the hydrodynamic bearing and allows the hydrodynamic bearing to rotate. The magnet is fixed to the hub. The base plate fixes the hydrodynamic bearing. The stator core is fixed to the base plate so as to be across from the magnet. Also, the base plate has a concave part, and the bottom face of the sleeve and the first flange unit in the hydrodynamic bearing is kept at a specific gap away from the base plate while being inserted into the concave part.

What is indicated here is the structural relationship between the base plate and the hydrodynamic bearing in a spindle motor.

It is preferable for a spindle motor to have a structure that prevents the lubricating fluid from scattering into the motor, and prevents the admixture of foreign matter from the outside into the gaps of the hydrodynamic bearing.

In view of this, a concave part is provided to the base plate to which the hydrodynamic bearing is attached, and the hydrodynamic bearing is inserted into this concave part.

The spindle motor pertaining to the sixteenth invention has a sleeve, a hub, a resin, and a rotor magnet. The sleeve rotatably supports a shaft. The hub includes a hole in which the shaft is press-fitted, has in the end region of the hole a concave part that is recessed by a specific distance from the surface and an inside-chamfered portion provided to the inner periphery of the concave part, and is welded to the shaft that has been press-fitted in the hole by irradiating the inside-chamfered portion with a laser beam. The resin is an adhesive resin and coated on the welded portion the rotor magnet is fixed to the hub and is across from a stator coil attached to a housing to which the sleeve is fixed.

What is indicated here is the basic structure of another spindle motor of the present invention, and the shape of the hub thereof.

Ordinarily, welding fumes generated during laser welding can enter the threaded hole and may cause contamination in the motor when assembling a HDD.

In view of this, a concave part that is recessed by a specific distance from the surface and an inside-chamfered portion provided to the inner periphery of the concave part are formed in the end region of the hole in the hub. When the hub and the shaft are welded by irradiating the V-shaped bottom of the inside-chamfered portion with a laser beam, any welding fumes generated during the welding will not readily go into the threaded hole, and furthermore, even if molten metal from the inside-chamfered portion should overflow, it will be contained in the concave part, and therefore will not make it to the surface of the hub.

This prevents welding fumes from scattering toward the threaded hole of the shaft, and yields a spindle motor with better operating performance.

The spindle motor pertaining to the seventeenth invention is the spindle motor pertaining to the sixteenth invention, further comprises a circular groove to prevent a lubricating fluid from leaching that is formed at a joint portion of the shaft and the hub.

What is indicated here is a further structure of the spindle motor.

Ordinarily, when the laser welding is used for manufacturing the spindle motor, the shaft and the hub are jointed together by only press-fitting. This is because, for example, an adhesive bond is burned during the welding when performing press-fitting and adhesive bonding, and it results in contaminations. However, only press-fitting cause a problem that a leaching of the lubricating fluid in the hydrodynamic bearing.

In view of this, at the joint portion of the shaft and the hub, the circular groove is formed to prevent the lubricant fluid from leaching and to make the lubricant fluid remain in the circular groove. The circular groove can be formed at either the shaft side or the hub side.

This yields a spindle motor with better operating performance.

The method for manufacturing a spindle motor pertaining to the eighteenth invention is a method for manufacturing a spindle motor comprising a cylindrical shaft having a threaded hole in its end face, a sleeve that rotatably supports a shaft, a hub that has a hole in which is press-fitted the end of the shaft having the threaded hole, and has in the end region of the hole a concave part that is recessed by a specific distance from the surface and an inside-chamfered portion provided to the inner periphery of the concave part, and a rotor magnet that is fixed to the hub and is across from a stator coil attached to a housing to which the sleeve is fixed, the method comprising, press-fitting in the hole the end of the shaft having the threaded hole, temporarily blocking the end face of the shaft having the threaded hole with a sealing jig, irradiating the inside-chamfered portion with a laser beam to weld the hub and the shaft, and coating with a resin that will bond to the welded portion after the welding.

What is indicated here is a spindle motor manufacturing method that prevents the scattering of welding fumes and the like.

Ordinarily, welding fumes generated during laser welding can enter the threaded hole and may cause contamination in the motor when assembling the HDD. Also, metal microparticles can fly out of microcracks and lower the performance of the spindle motor.

In view of this, the threaded hole is temporarily blocked off by the sealing jig during the welding of the shaft and the hub, which prevents the scattering of welding fumes. Furthermore, the welds are coated with a resin after welding, so the microcracks are covered by the resin, and this suppresses the scattering of metal microparticles.

This allows a spindle motor to be manufactured with good precision.

The method pertaining to the nineteenth invention is the method for manufacturing a spindle motor pertaining to the eighteenth invention, wherein the threaded hole is blocked with the sealing jig only during coating with the resin.

What is indicated here is a spindle motor manufacturing method in which the threaded hole is blocked off during coating with a resin.

During resin coating, extra resin may find its way into the threaded hole and lower the performance of the spindle motor.

In view of this, the resin is prevented from getting into the threaded hole by blocking the hole during resin coating.

This allows a spindle motor to be manufactured with good precision.

The method pertaining to the twentieth invention is a method for manufacturing a spindle motor comprising a cylindrical shaft having a threaded hole in its end face, a sleeve that rotatably supports a shaft, a hub that has a hole in which is press-fitted the end of the shaft having the threaded hole, and has in the end region of the hole a concave part that is recessed by a specific distance from the surface and an inside-chamfered portion provided to the inner periphery of the concave part, and a rotor magnet that is fixed to the hub and is across from a stator coil attached to a housing to which the sleeve is fixed, the method comprising press-fitting in the hole the end of the shaft having the threaded hole, irradiating the inside-chamfered portion with a laser beam to weld the hub and the shaft, and blocking the threaded hole with a sealing jig after welding, while coating with a resin that will bond to the welded portion after the welding.

What is indicated here is a spindle motor manufacturing method in which the threaded hole is blocked off during resin coating.

During resin coating, extra resin may find its way into the threaded hole and lower the performance of the spindle motor.

In view of this, the resin is prevented from getting into the threaded hole by blocking the hole during resin coating.

This allows a spindle motor to be manufactured with good precision.

DETAILED DESCRIPTION OF THE INVENTION

Embodiments of the present invention will now be described.

Embodiment 1

A spindle motor 100 that features a bearing unit 101 that is the hydrodynamic bearing pertaining to this embodiment will now be described through reference to FIGS. 1 to 5.

Structure of Spindle Motor 100

In very broad terms, the spindle motor 100 is made up of stationary units and rotating units.

Figure 1:
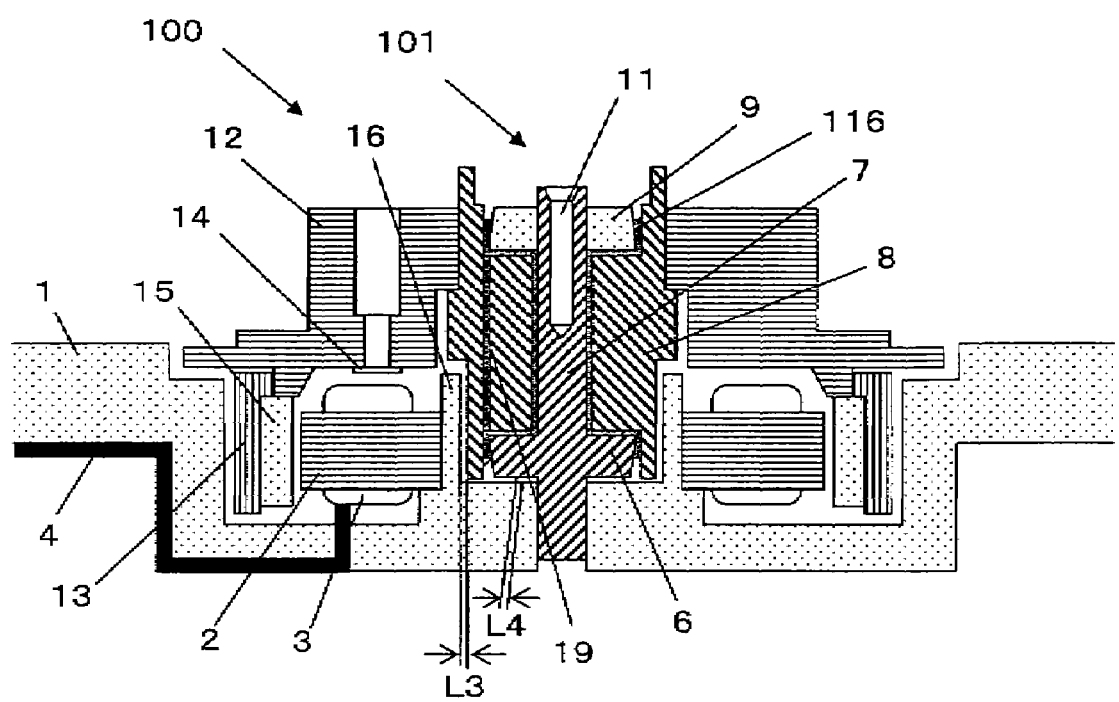
FIG. 1 is a cross-sectional view of the structure of a spindle motor having a hydrodynamic bearing in an embodiment of the present invention.

Examples of the stationary units include, as shown in FIG. 1, a base plate 1, a stator core 2, a coil 3, an insulating tube 4, a first flange unit 6, a shaft 7, a second flange unit 9, and a cylindrical wall 16. The base plate 1 is composed of an aluminum alloy or the like. Silicon steel plate or the like is used for the stator core 2, and the coil 3 composed of a cuprous metal or the like wound around this core to form a stator core assembly. The stator core assembly is fixed to the base plate 1 by press-fitting and adhesive bonding, for example. One end of the insulating tube 4 is inserted to coil leads, and the other end is led out to the outside of the device. A heat-shrinkable tube composed of a polyolefin resin or the like is often used for the insulating tube 4. The flange units 6 and 9 are dynamic pressure generators, and are composed of stainless steel or another such material. The role of the shaft 7 is that of a support that stably bears the bearing unit 101 and in turn the spindle motor 100. The shaft 7 is composed of stainless steel or the like, and is press-fitted and adhesively bonded to the base plate 1. The cylindrical wall 16 forms a concave part in the base plate 1.

As shown in FIG. 1, for example, the rotating units include a sleeve 8, a back yoke 13, an air seal 14, and a magnet 15. The sleeve is produced by subjecting a copper alloy to electroless nickel plating, for example. A hub 12 composed of an aluminum alloy or the like supports a recording medium or the like (not shown), and is affixed to and rotates integrally with the sleeve 8. The back yoke 13 is composed, for example of a magnetic material produced by subjecting a ferrous metal to electroless nickel plating, and is fixed to the hub 12 by press-fitting or the like. The magnet 15 is adhesively bonded and fixed to the back yoke 13 and then heated and hardened. An Ne-Fe-Bo-based resin magnet is usually used for this magnet. The air seal 14 mainly blocks off the space in which the recording medium is supported and the space in which the stator core assembly is located. The magnet 15 is disposed across from the stator core assembly and provides the motive power for the rotation of the rotating units. The lower ends of the first flange unit 6 and the sleeve 8 are inserted in this concave part, resulting in what is called a labyrinth structure.

Here, the gap L3 between the outer periphery of the sleeve 8 and the inner periphery of the cylindrical wall 16 is 0.25 mm or less, for example.

A specific gap L4 is formed between the bottom faces of the first flange unit 6 and the base plate 1. The gap L4 is necessary to adjust the height position of the shaft 7 when the shaft 7 is press-fitted into the base plate 1. At the same time, since the bottom face of the first flange unit 6 and the base plate 1 is coated with an oil repellant 24 (discussed in detail below), a gap large enough to accommodate this must be also be provided. The gap L4 is usually about 0.2 mm.

Of the above units, the shaft 7, the flange units 6 and 9, the sleeve 8, and a lubricating fluid 116 constitute the bearing unit 101 (a hydrodynamic bearing). The structure of the bearing unit 101 will now be discussed in detail.

Structure of Bearing Unit 101

An example of the structure of the bearing unit 101 will be described through reference to FIG. 2.

Figure 2:
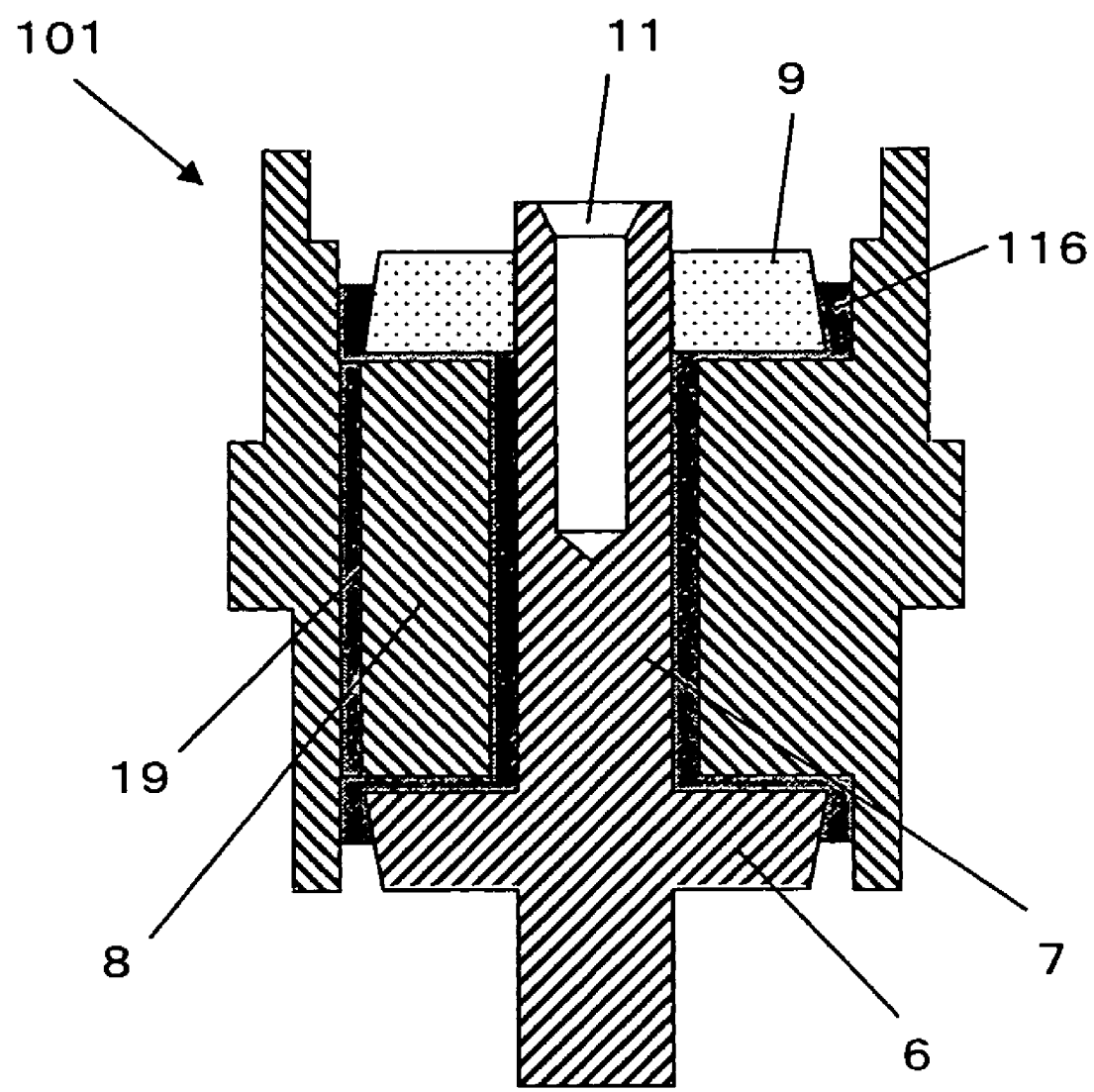
FIG. 2 is a diagram of the structure of a hydrodynamic bearing in an embodiment of the present invention.

The bearing unit 101 is made up of the shaft 7, the flange units 6 and 9, the sleeve 8, and the lubricating fluid 116, which are combined as shown in FIG. 2.

The shaft 7 is located in the center of the bearing unit 101, and its lower end is inserted in the base plate 1 (see FIG. 1). The shaft 7 has a threaded hole 11 in its top face for fixing a cover (not shown) that covers the upper face of the spindle motor 100 (see FIG. 1). A radial dynamic pressure generating groove is formed in the outer peripheral face of the shaft 7 or the inner peripheral face of the sleeve 8. The first flange unit 6 may be fixed to or integrated with the shaft 7. A thrust dynamic pressure generating groove is formed in the face of the sleeve 8 across from the first flange unit 6, or the face of the first flange unit 6 across from the sleeve 8. The second flange unit 9 is fixed to the shaft 7. A thrust dynamic pressure generating groove is formed in the face of the second flange unit 9 across from the sleeve 8, or the face of the sleeve 8 across from the second flange unit 9. The lubricating fluid 116 is injected into the space in which these dynamic pressure generating grooves are formed, that is, the bearing gap.

A communicating passage 19 that communicates with the above-mentioned two thrust dynamic pressure generating grooves is formed in the sleeve 8, which achieves pressure equilibrium inside the bearing. The communicating passage 19 may be formed by making a hole in the sleeve 8, or the sleeve may be divided into outer and inner sleeves, and part of the outer periphery of the inner sleeve may be given a D-cut or the like and these two parts fitted together.

Method for Manufacturing Bearing Unit 101

Next, an example of the method for manufacturing the bearing unit 101 will be described through reference to FIG. 3.

Figure 3:
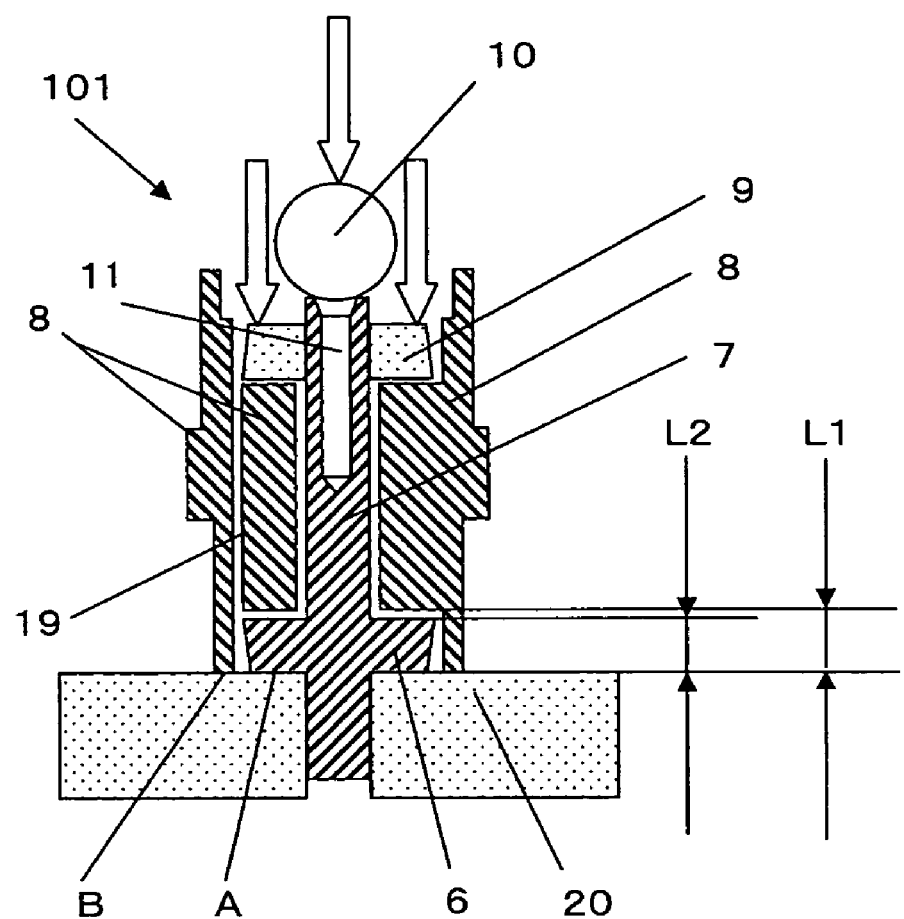
FIG. 3 is a diagram of the method for manufacturing a hydrodynamic bearing in an embodiment of the present invention.

First, as shown in FIG. 3, the lower end of the shaft 7 on which the first flange unit 6 has been formed is inserted in a receiving jig 20 whose surface has been polished. The receiving jig 20 serves as a base for stably and horizontally fixing the bearing unit 101. Next, the sleeve 8 is allowed to fall under its own weight onto the shaft 7 so that the sleeve 8 is rotatable with respect to the shaft 7.

The face (A face) where the first flange unit 6 hits the receiving jig 20, and the face (B face) where the sleeve 8 hits the receiving jig 20 lie in the same plane in the receiving jig 20. However, depending on the size and shape of the first flange unit 6 and the sleeve 8, the A and B faces may lie in different planes in the receiving jig 20.

We will let L1 here be the distance from the B face to the dynamic pressure face on the sleeve 8 side, and L2 be the distance from the A face to the dynamic pressure face on the first flange unit 6 side. This gives L1>L2. If we assume that L1−L2=Gs, then Gs is the distance of the gap between the first flange unit 6 and the sleeve 8, that is, the thrust bearing gap.

If Gs here is wide, the dynamic pressure in the axial direction will be unbalanced, thrust stiffness will decrease, and motor performance will decline. Conversely, if Gs is narrow, resistance of the lubricating fluid will rise, bearing loss will increase, and the motor current will go up. Therefore, when ease of assembly and thrust stiffness and motor current consumption after assembly are taken into account, Gs may be a distance from 15 to 25 µm. It is preferably limited to 20 µm.

In the welding of the second flange unit 9 to the shaft 7, the top face of the second flange unit 9 is pressed. Accordingly, the second flange unit 9 is preferably fixed snugly against the face of the sleeve 8 across from the second flange unit 9 in the axial direction. The gap between the second flange unit 9 and the sleeve 8 in the axial direction can be formed by moving the sleeve 8 downward in the axial direction relative to the shaft 7 after welding.

The second flange unit 9 is inserted while the distance Gs is thus restricted.

Figure 4:
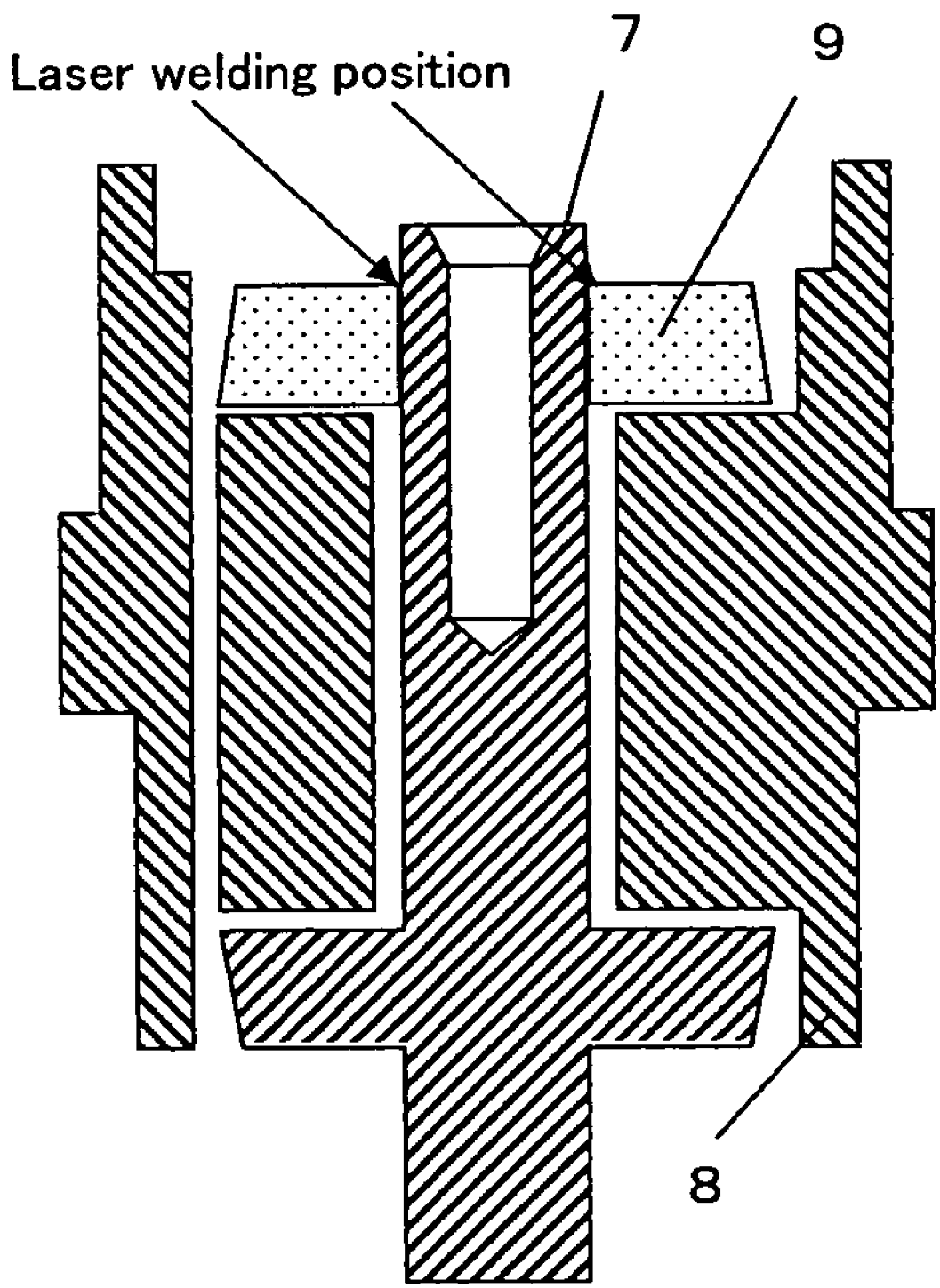
FIG. 4 is a diagram of weld sites of a hydrodynamic bearing in an embodiment of the present invention.

Next, a spherical jig 10 (holding jig) is placed on the top face of the shaft 7 while the outer periphery of the top face of the second flange unit 9 in the axial direction is pressed. This spherical jig 10 also serves as a sealing unit. Therefore, the top face of the shaft 7 in the axial direction is pressed while the threaded hole 11 is sealed with the spherical jig 10, and either the entire periphery near the boundary between the shaft 7 and the second flange unit 9, or a plurality of locations along this periphery, are laser welded. This laser may be a YAG laser or the like. FIG. 4 shows the laser welding locations. The spherical jig 10 is capable of sealing the threaded hole 11 of the shaft 7 without scratching it, and allows uniform pressure to be applied to the shaft 7, so its contact face with the shaft 7 may be spherical.

Figure 5:
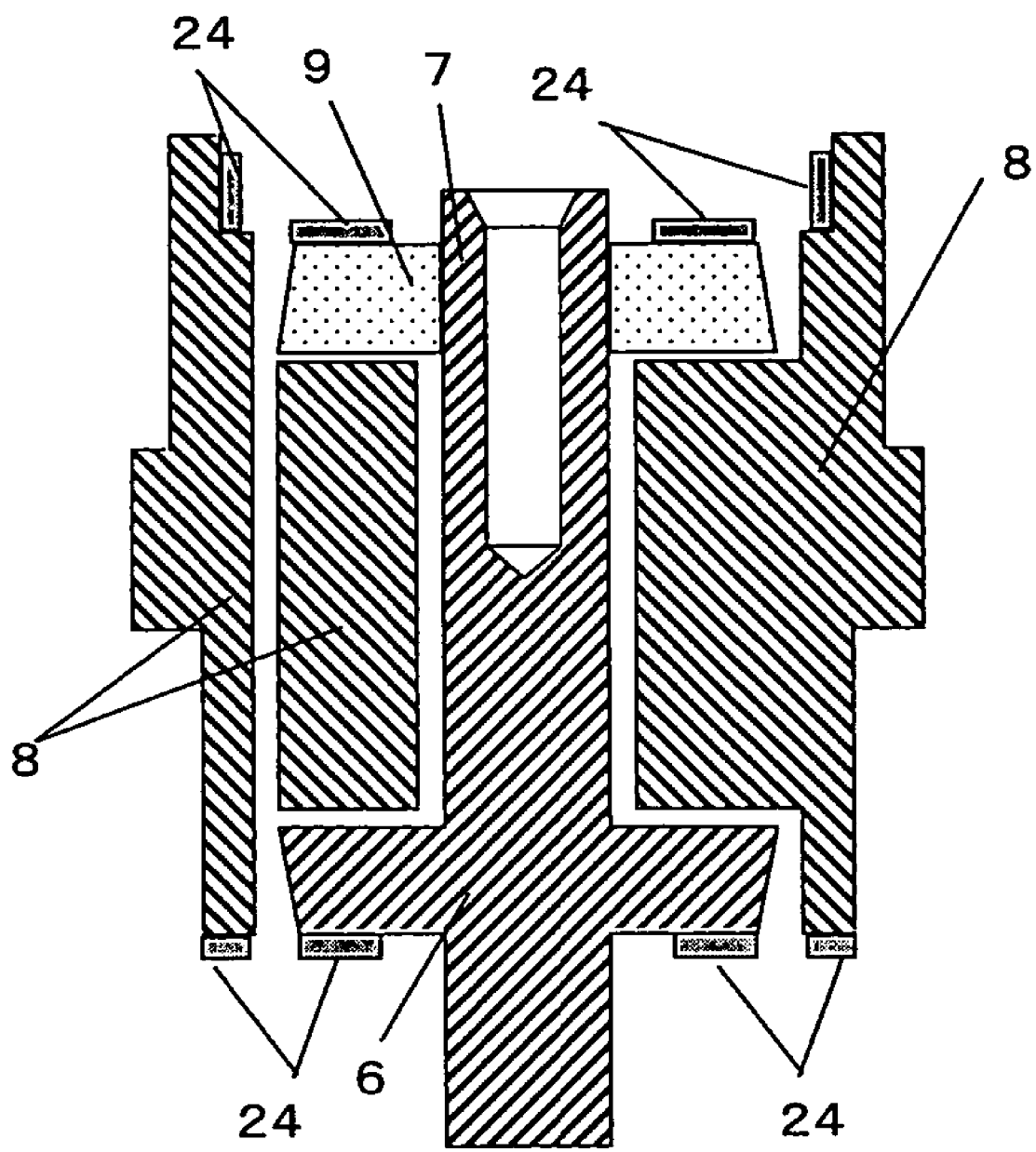
FIG. 5 is a diagram of the oil repellant coating location of a hydrodynamic bearing in an embodiment of the present invention.

After this, as shown in FIG. 5, on the top side of the bearing unit 101, the outer periphery of the top face of the second flange unit 9 and the inner peripheral face of the sleeve 8 near the opening of the bearing unit 101 are coated with an oil repellant 24. On the bottom side of the bearing unit 101, the outer periphery of the bottom face of the first flange unit 6 and either just the inner periphery or the entire bottom face of the sleeve 8 are coated with the oil repellant 24. A fluorine-based oil repellant is usually used as the oil repellant 24.

Once assembled by the above method, the bearing unit 101 is put in a vacuum chamber (not shown) and placed under a low-pressure environment, and the lubricating fluid 116 is dropped into the gap of the bearing. After the entire bearing gap has been filled with the lubricating fluid 116, the vacuum chamber is returned to atmospheric pressure and left in that state for a specific length of time. The lubricating fluid here may be oil, for example.

After this, a top cover (not shown) may be adhesively fixed to the top face of the second flange unit 9 as desired.

With the above method, even when laser welding is employed, the gap between the flange units 6 and 9 and the sleeve 8 can be accurately maintained, and the bearing unit 101 can be manufactured with good precision.

Features of the Manufacturing Method (1) The constituent elements of the bearing unit 101 manufactured in this embodiment are the shaft 7, the sleeve 8 that is attached in a state of being rotatable relative to the shaft 7, the first flange unit 6 that is fixed to or integrated with the shaft 7, the second flange unit 9 that is fixed to the shaft 7, and so forth. The process of manufacturing this bearing unit 101 includes the following steps. (1) Inserting the second flange unit 9 after inserting the sleeve 8 to the shaft 7, (2) pressing on the top face of the second flange unit 9 in the axial direction, (3) maintaining this pressing state while the shaft 7 and the second flange unit 9 are welded, thereby fixing the second flange unit 9 to the shaft 7.

As a result, the second flange unit moves in the axial direction during welding, and the heat imparted during welding results in vertical warping, which therefore avoids the problem of being unable to ensure the specified gap in the axial direction.

Therefore, a hydrodynamic bearing can be manufactured with good precision while the specified gap is ensured in the axial direction.

(2) With the method for manufacturing the bearing unit 101 in this embodiment, the top face of the shaft 7 in the axial direction is also pressed in the course of pressing the top face of the second flange unit 9 in the axial direction in the above-mentioned second step.

During the welding of the shaft 7 and the second flange unit 9, the effect of shrinkage stress at the weld sites raises even the shaft, which is a problem in that the specified gap in the axial direction cannot be sufficiently ensured.

In view of this, the top face of the shaft 7 in the axial direction may also be pressed so that the shaft 7 is fixed during welding.

This makes it possible to manufacture a hydrodynamic bearing with good precision while ensuring the specified gap in the axial direction.

(3) The shaft 7 of the bearing unit 101 in this embodiment has the threaded hole 11 in its end face, and the method for manufacturing the bearing unit 101 in this embodiment involves pressing the top face of the shaft 7 in the axial direction while blocking off the threaded hole 11 in the above-mentioned second step.

This avoids the problem whereby welding fumes and the like scatter during welding and find their way into the threaded hole.

Therefore, the decrease in the manufacturing precision of the hydrodynamic bearing can be minimized.

(4) The method for manufacturing the bearing unit 101 in this embodiment involves using a holding jig to press on the top face of the shaft in the axial direction.

This allows the top face of the shaft to be pressed with good precision.

(5) In the method for manufacturing the bearing unit 101 in this embodiment, the holding jig has elasticity.

This allows the pressing force to be imparted uniformly to the top face of the shaft 7.

Therefore, the top of the shaft 7 can be pressed with good precision.

(6) In the method for manufacturing the bearing unit 101 in this embodiment, the holding jig has a spherical shape at its distal end.

This allows the top face of the shaft 7 to be pressed with good precision, without being scratched.

(7) In the method for manufacturing the bearing unit 101 in this embodiment, the second flange unit 9 is fixed to the shaft 7 by welding.

Press-fitting and adhesive bonding or another such method is generally used to fix these units, but this method is not suitable with the present invention. This is because a gap is provided between the outer peripheral face of the shaft 7 and adjacent units, and contamination by burrs and the like produced in press-fitting and adhesive bonding must be avoided.

Also, as discussed above, the method for manufacturing the bearing unit 101 avoids problems encountered in welding.

Accordingly, the bearing unit 101 can be manufactured with good precision by welding.

Embodiment 2

A spindle motor 200 pertaining to this embodiment will be described through reference to FIGS. 10 to 12.

Figure 10:
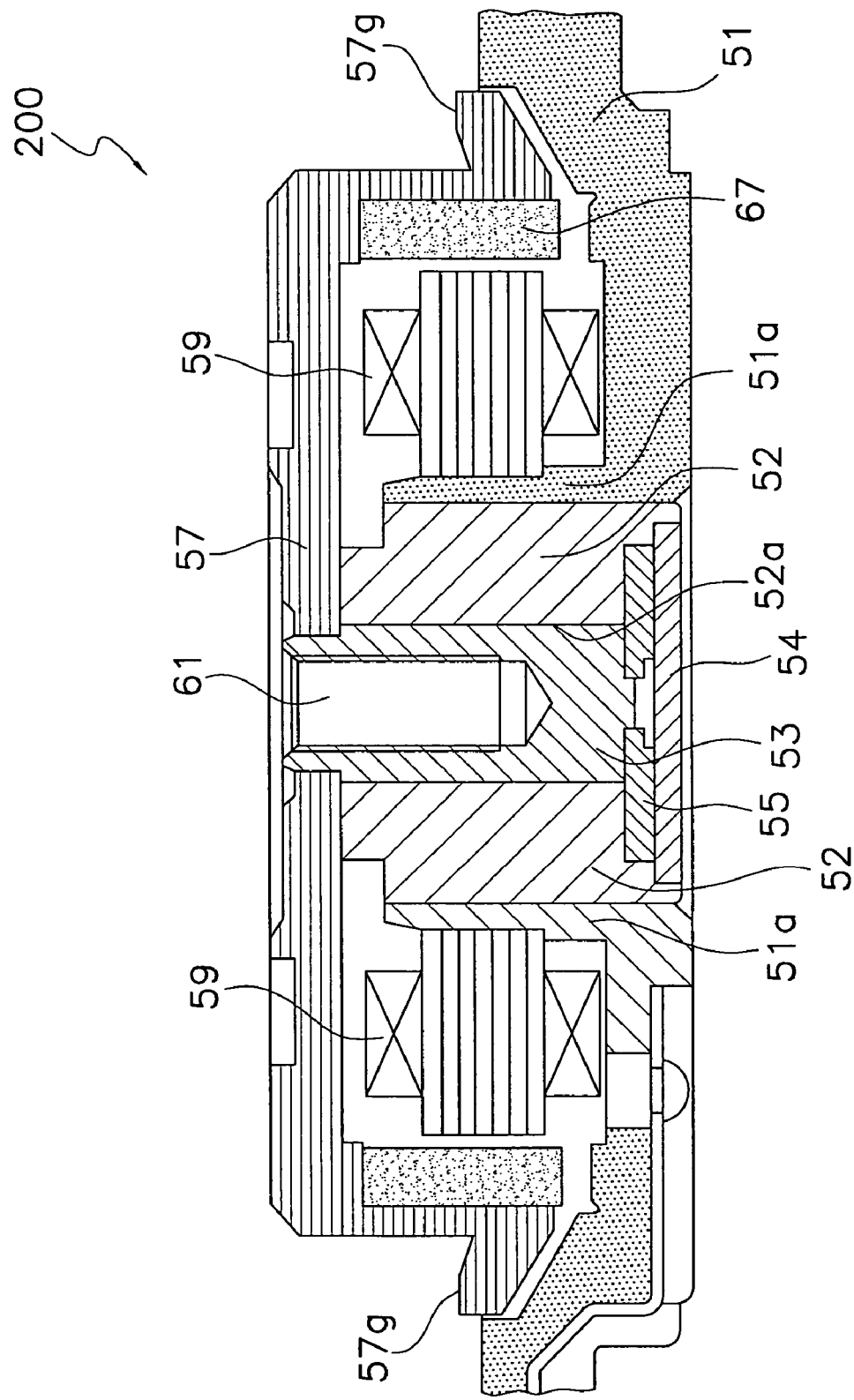
FIG. 10 is a cross-sectional view of a spindle motor in yet another embodiment of the present invention.

FIG. 10 is a cross-sectional view of the spindle motor 200.

In FIG. 10, a housing 51 has a cylindrical unit 51*a* in its middle, and a sleeve 52 is attached to the cylindrical unit 51*a* A shaft 53 is rotatably inserted into a bearing hole 52*a* of the sleeve 52. A flange 55 is attached to the bottom of the shaft 53. An opening at the bottom of the sleeve 52 is sealed off by a thrust receiving plate 54. A fluid such as oil fills the space between the shaft 53 and the sleeve 52 and the space between the thrust receiving plate 54 and the flange 55. This constitutes a hydrodynamic bearing that is known in this field of technology.

In this embodiment, an aluminum die-cast material or an iron material is used for the housing 51. The sleeve 52 is produced by nickel plating a brass material (copper alloy). A stainless steel material (such as SUS 420J2) is used for the shaft 53, and a stainless steel material (such as SUS 304) is used for the flange 55. A stainless steel material (such as SUS 420J2) is used for the thrust receiving plate 54, and a stainless steel material (such as DHS1) or an aluminum material is used for a hub 57.

The hub 57 is attached to the top part of the shaft 53 by a method that will be described in detail below.

A threaded hole 61 that is parallel to the axial direction of the shaft 53 is provided in the center of the shaft 53. A magnetic disk or the like is supported on a disk receiving face 57*g* on the outer periphery of the hub 57 by fixing a screw (not shown) in the threaded hole 61 by using a threaded clamping unit. A rotor magnet 67 is provided on the inside of the hub 57. A stator core 59 is attached to the housing 51 so as to be across from the rotor magnet 67.

How the shaft 53 and the hub 57 are attached will now be described.

Figure 11A:
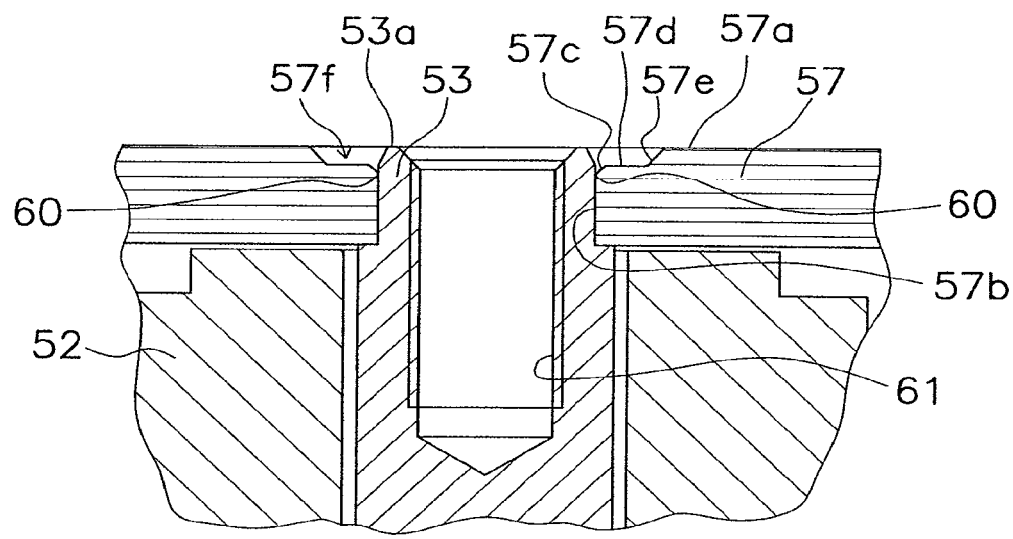
FIG. 11A is a detailed cross-sectional view of the main attachment portions of a shaft and a hub in a spindle motor.
Figure 12:
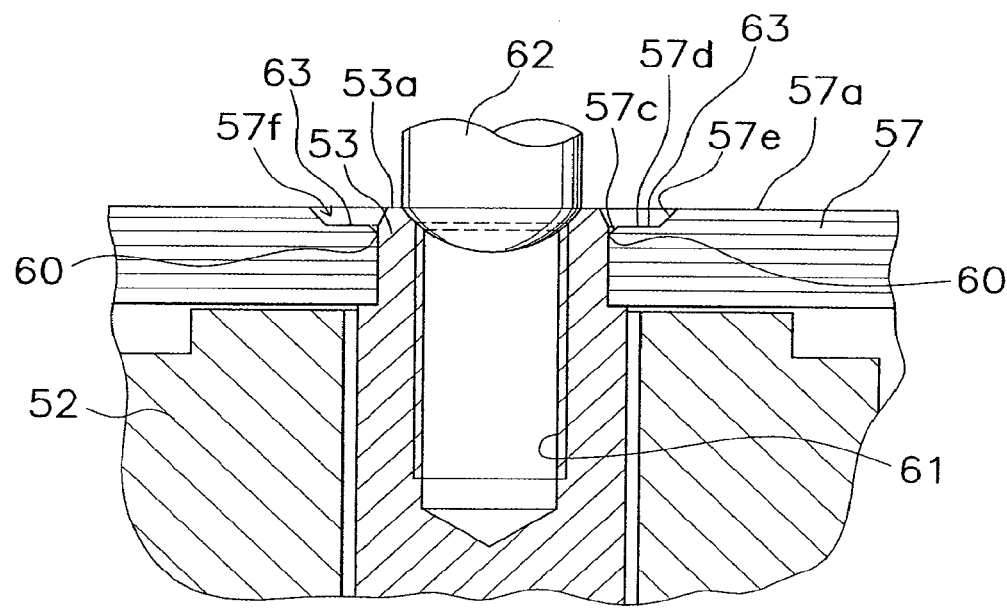
FIG. 12 is a detailed cross-sectional view of the main components during the welding of a shaft and a hub in a spindle motor.
Figure 11B:
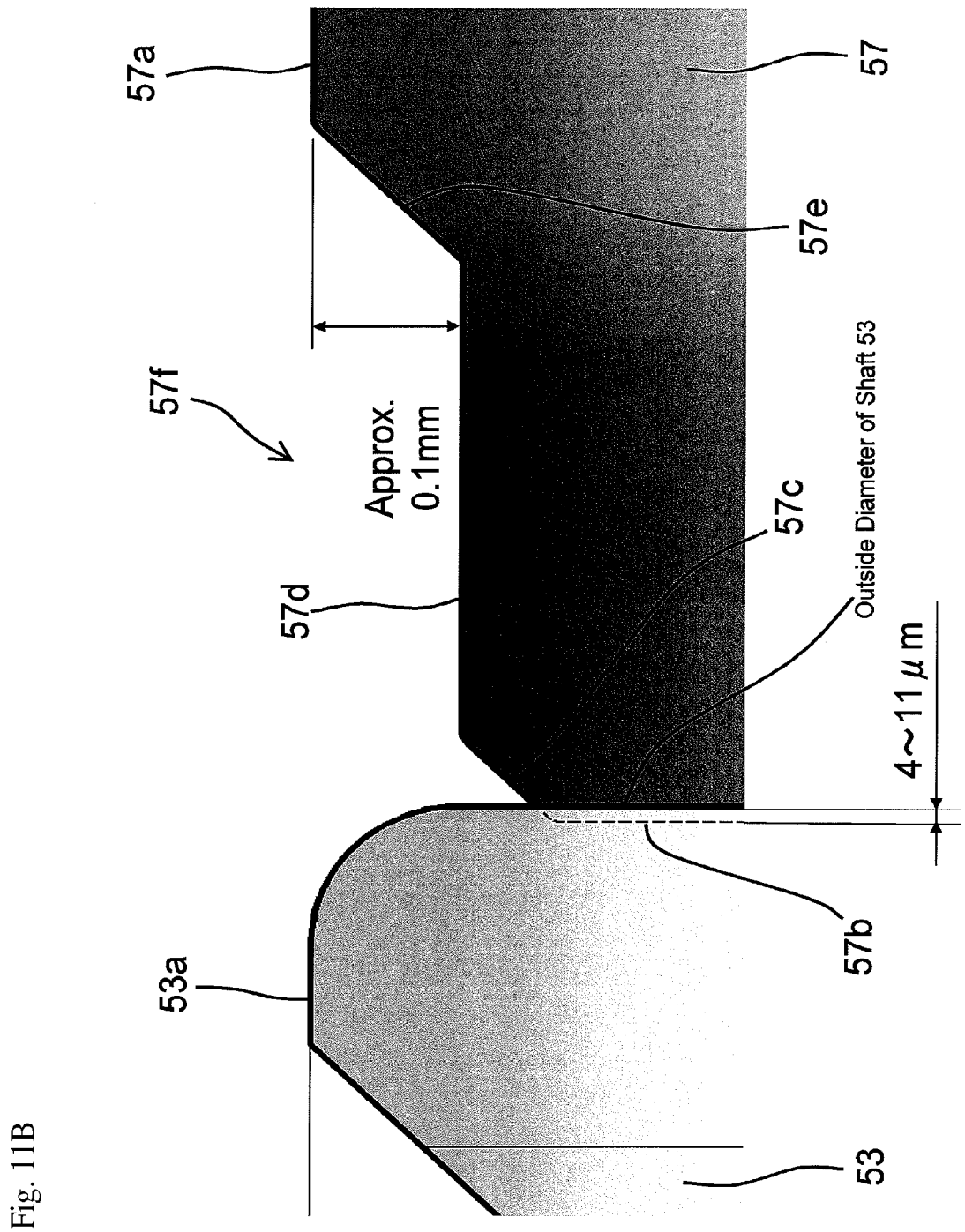
FIG. 11B is an enlarged view of an area in FIG. 11A, showing the shaft press-fitted into the hub.
Figure 13:
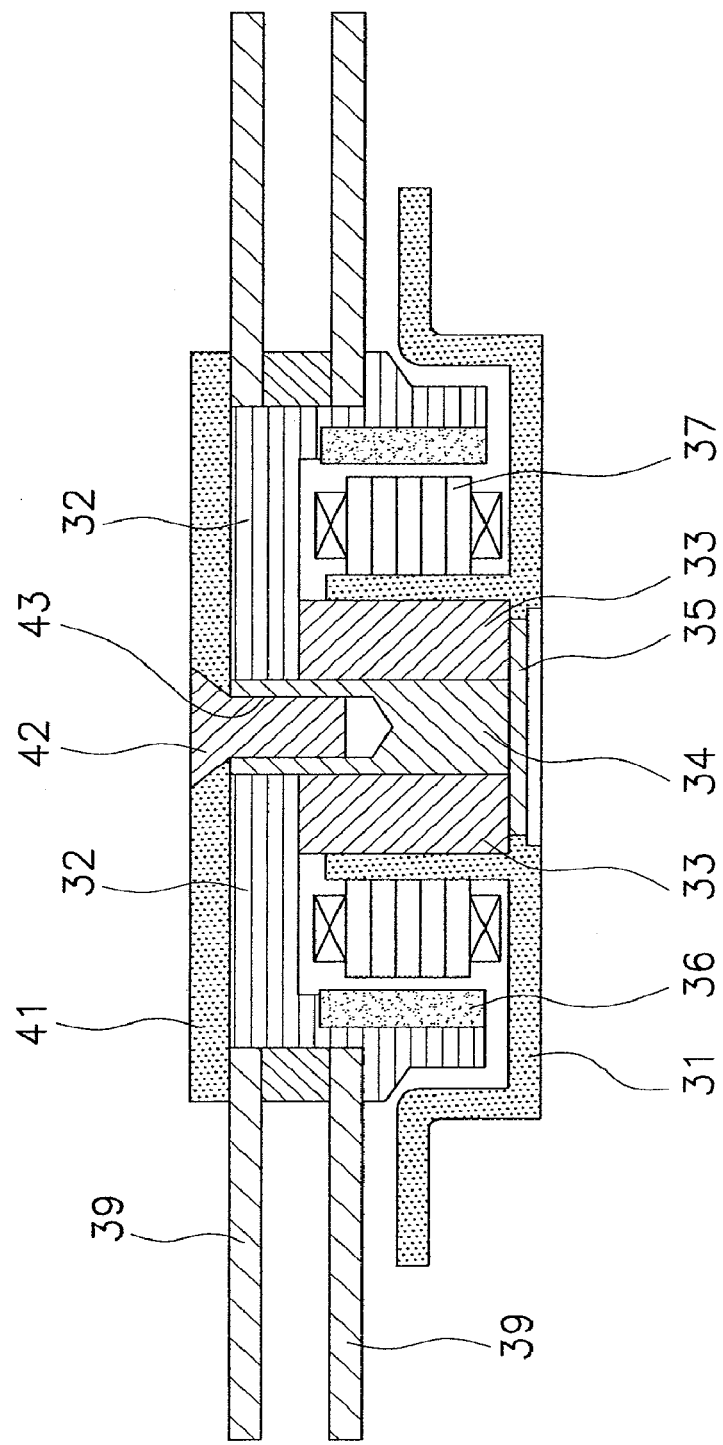
FIG. 13 is a cross-sectional view of a conventional spindle motor.
Figure 14A:
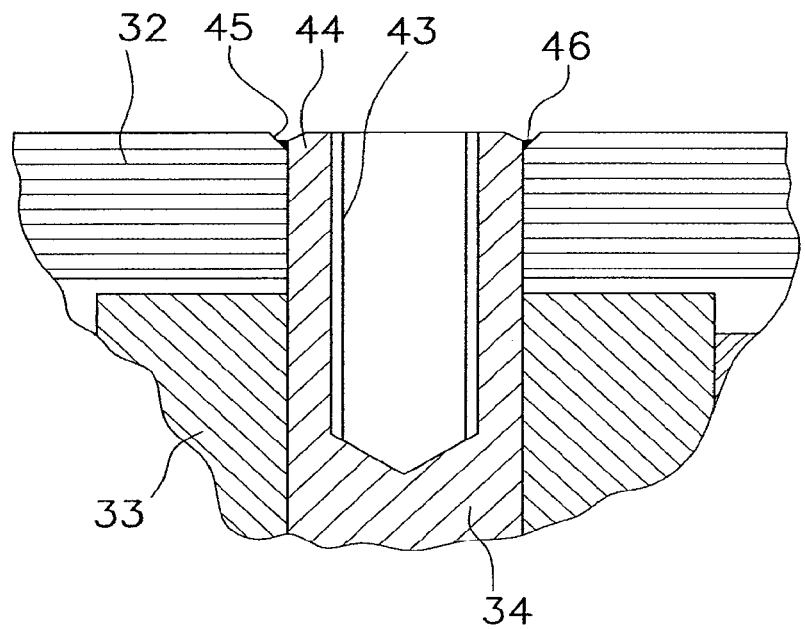
FIGS. 14A-14B show detailed cross-sectional views of the main attachment portions of a shaft and a hub in a conventional spindle motor.
Figure 14B:
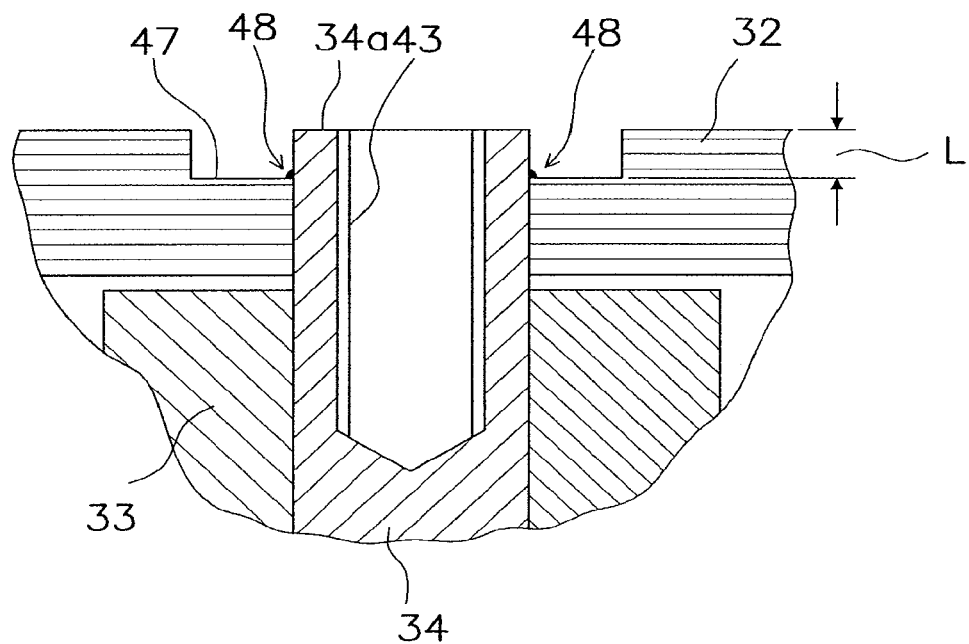

FIGS. 11A and 11B show detailed cross-sectional views of the attachment parts of the shaft 53 and the hub 57. When the hub 57 is attached to the shaft 53, first the shaft 53 is press-fitted into the hole 57*b* of the hub 57. The outside diameter of the shaft 53 is 4 to 11 μm larger than the inside diameter of the hole 57*b*, so that the press-fit removal strength is about 10 kgf. The top face 53*a* of the shaft 53 and the top face 57*a* of the hub 57 after press-fitting are at substantially the same height. A curved surface with a radius of about 0.1 mm is formed at the corner of the outer periphery of the shaft 53. The corner on the inner periphery of the attachment hole 57*b* of the hub 57 is subjected to inside-chamfering of about 0.05 mm, forming an inside-chamfered portion 57*c*. A flat portion 57*d* connected to the inside-chamfered portion 57*c* is the bottom face of a concave part 57*f* with a depth of approximately 0.1 mm from the top face 57*a*. With a small spindle motor, the depth of the concave part 57*f* may be substantially the same (about 0.1 mm) regardless of the size of the motor. Since the 0.1 mm depth of the concave part 57*f* is so small, it will have little effect on reducing the size and thickness of the spindle motor. A slanted face 57*e* is formed between the flat portion 57*d* and the top face 57*a*.

Next, the shaft 53 and the hub 57 are welded with a laser welding apparatus featuring a YAG laser or the like. As shown in FIG. 12, prior to welding, a sealing jig 62 provided at its distal end with a metal sphere or cone having a diameter slightly larger than the diameter of the threaded hole 61 is placed against the threaded hole 61 to block off the threaded hole 61. Blocking off the threaded hole 61 with the sealing jig 62 prevents welding fumes from entering the threaded hole 61 should such welding fumes be generated during welding. However, the sealing jig 62 need not be used if some other welding fume removal means is employed.

Figure 15:
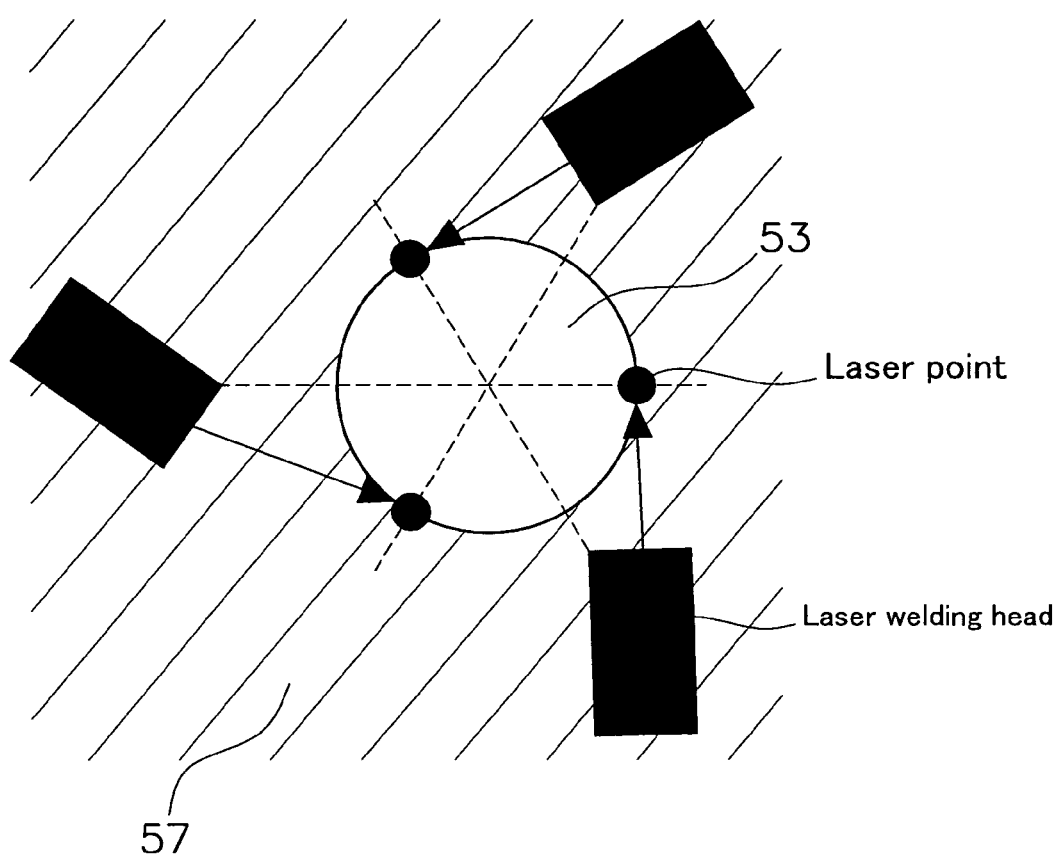
FIG. 15 is an overview of performing a laser welding.

In the welding step, a laser beam is directed toward the bottom 60 of a valley-shaped concave part formed by the inside-chamfered portion 57*c* and the outer peripheral face of the shaft 53. During the laser welding, as shown in FIG. 15, the hub 57 is rotated and simultaneously irradiated with laser by three laser welding heads. The rotation speed of the hub 57 is set approximately 200-300 r/min. The output of the laser is approximately 1-2 kW, and irradiated by 20-30 pulse/sec. The intensity of the laser beam and the irradiation time are set so that the metal material of the hub 57 and the shaft 53 near the bottom 60 will melt and this molten metal will embed the valley-shaped concave part including the inside-chamfered portion 57*c*. Even if the molten metal should overflow from the valley-shaped concave part, it will just flow into the concave part 57*f*. Accordingly, this prevents the molten metal from overflowing the top face 57*a* of the hub 57.

Upon completion of the laser welding, the weld including the flat portion 57*d* is washed with a brush and a washing solvent. After the washing solvent has been completely evaporated, the concave part 57*f* including the flat portion 57*d* is coated with a resin 63. This step is called the "overcoating step." Overcoating with the resin 63 allows the microcracks produced by laser welding to be covered up, and therefore prevents microparticles of metal from flying out of the microcracks during the operation of the spindle motor. The resin 63 is preferably composed of a material that will cure in a short time after coating and will not release gas after curing. A thermosetting epoxy adhesive is a readily available and inexpensive example of such a resin. A two-liquid epoxy adhesive may also be used, for instance. The resin 63 coating amount should be about 0.1 mg for a spindle motor having a shaft diameter of 2 mm.

In the overcoating step, excess resin can be prevented from getting into the threaded hole 61 if the threaded hole 61 is blocked off with the sealing jig 62 during coating with the resin 63.

With a spindle motor manufactured by the above method, the removal strength of the shaft 53 and the hub 57 after laser welding was approximately 80 kgf, which represents sufficient strength. Since the threaded hole 61 was blocked off by the sealing jig 62 during welding, no welding fumes got into the threaded hole 61. If the threaded hole 61 was also blocked off by the sealing jig 62 in the overcoating step after welding, then no excess resin got into the threaded hole 61.

Thus, the manufacturing method of the present invention greatly increases the spindle motor manufacturing yield, and increases the reliability and service life of HDDs and so forth that make use of spindle motors.

Figure 6A:
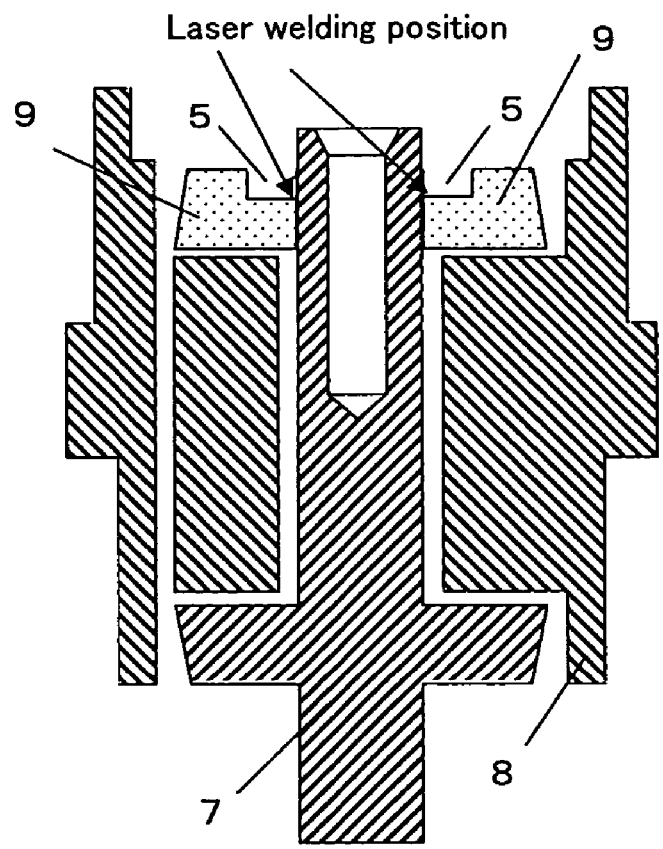
FIG. 6a is a diagram of the structure and weld sites of a hydrodynamic bearing in another embodiment of the present invention.

Other Embodiments (A) In Embodiment 1 above, an example in which the area near the boundary between the shaft 7 and the second flange unit 9 was laser welded in order to fix the second flange unit 9 to the shaft 7 was described through reference to FIG. 4. The shape of the second flange unit 9 here is not limited to this, however. For instance, as shown in FIG. 6*a*, the second flange unit may have a concave part 5 on the inner peripheral side of the top face in the axial direction, and laser welding may be performed in the area near the boundary between the bottom of this concave part 5 and the shaft 7.

The effect of the concave part 5 is to prevent warpage of the second flange unit 9 during welding and prevent the scattering of foreign matter.

When welding is performed with the configuration shown in FIG. 4, a load is applied that draws the top face of the second flange unit 9 toward the inner periphery. Consequently, the second flange unit 9 may be warped upward in the axial direction (so that the outer periphery is higher than the inner periphery).

In the above embodiment, the outer peripheral side of the top face of the second flange unit 9 in the axial direction was pressed in order to keep this warpage within a specified range. If, in addition to this, the concave part 5 shown in FIG. 6a is provided, the load that draws the second flange unit 9 toward the inner periphery as a result of melting is instead exerted near the bottom of the concave part 5, and therefore has less effect on the top face. This means that the warpage of the second flange unit 9 is ameliorated.

Also, it is usually common for welding fumes or soot and other such foreign matter produced in welding to scatter during welding, and for these to affect the manufacturing precision of other units. It is therefore preferable for this foreign matter to be wiped away, sucked up with air, or otherwise removed after laser welding, but even then there will be scattering of foreign matter.

As shown in FIG. 6a, however, the scattering of foreign matter can be suppressed by providing the concave part 5 to the inner peripheral side of the second flange unit 9.

This provides a bearing unit 101 with better performance.

(B) In the above Embodiment 1 and the above (A), an example of using laser welding to fix the second flange unit 9 to the shaft 7 was described. After this, though, the laser welded sites may be further overcoated with an adhesive resin (adhesive bond) or the like.

The purpose of this is to prevent fouling of the interior of the bearing unit 101 or the spindle motor 100 by contamination that falls or flies out of microcracks produced at the laser welding sites.

This provides a bearing unit 101 with better performance.

Figure 6B:
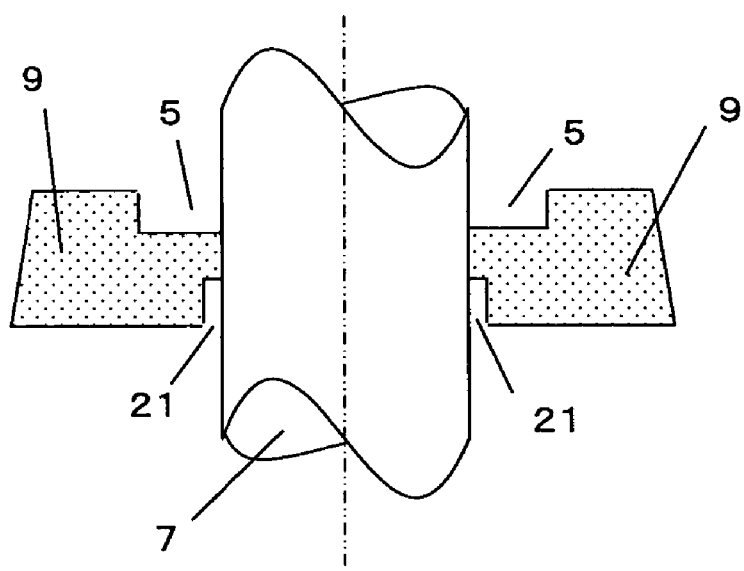
FIG. 6b is a detail view of part of the structure of a hydrodynamic bearing in yet another embodiment.

(C) In the above Embodiment 1 and the above (A), the shape of the second flange unit 9 was described, but the shape is not limited to this. For instance, as shown in FIG. 6b, the second flange unit 9 may further have a bubble escape portion (a concave part) 21 on the inner peripheral side of the bottom face in the axial direction.

When the bearing unit 101 is operated after its manufacture, bubbles may be produced in the lubricating fluid 116 injected into the gaps between the units, and may hamper the smooth operation of the bearing unit 101. Bubbles that move from the radial bearing region to the thrust bearing region try to accumulate at the boundary thereof. This is because centrifugal force acts on the lubricating fluid while the bearing is operating, and the lubricating fluid, which has a high specific gravity, moves toward the outside of the thrust bearing, while bubbles, which have a low specific gravity, move toward the inside of the thrust bearing. Also, bubbles produced in the thrust bearing region move toward the inside of the thrust bearing similarly to the above.

In view of this, a concave part is provided as a bubble escape portion 21 on the inner peripheral side of the bottom face of the second flange unit 9 in the axial direction. The bubbles flow into and accumulate in this concave part, and do not impede the smooth operation of the bearing unit 101.

This makes it possible to sustain the smooth operation of the bearing unit 101.

As to the size of the concave part 5 and the bubble escape portion 21, if, for example, the diameter of the shaft 7 is approximately 3.5 to 4.5 mm and the thickness of the second flange unit 9 is approximately 2 to 4 mm, the inside diameter of the concave part 5 will be approximately 5.5 mm (1.5 to 2 times the shaft diameter) and the depth approximately 1 mm (less than one-third the thickness of the second flange unit 9), and the inside diameter of the bubble escape portion 21 will be approximately 3.7 mm (less than the minimum inside diameter of the thrust bearing groove portion and greater than the sleeve inside diameter) and the depth approximately 1 mm (less than one-third the thickness of the second flange unit 9 and greater than the thrust gap).

Also, a location of the bubble escape portion 21 is not limited to the above. For instance, the bubble escape portion 21 can be formed on the first flange unit 6 fixed on the shaft 7.

Figure 7:
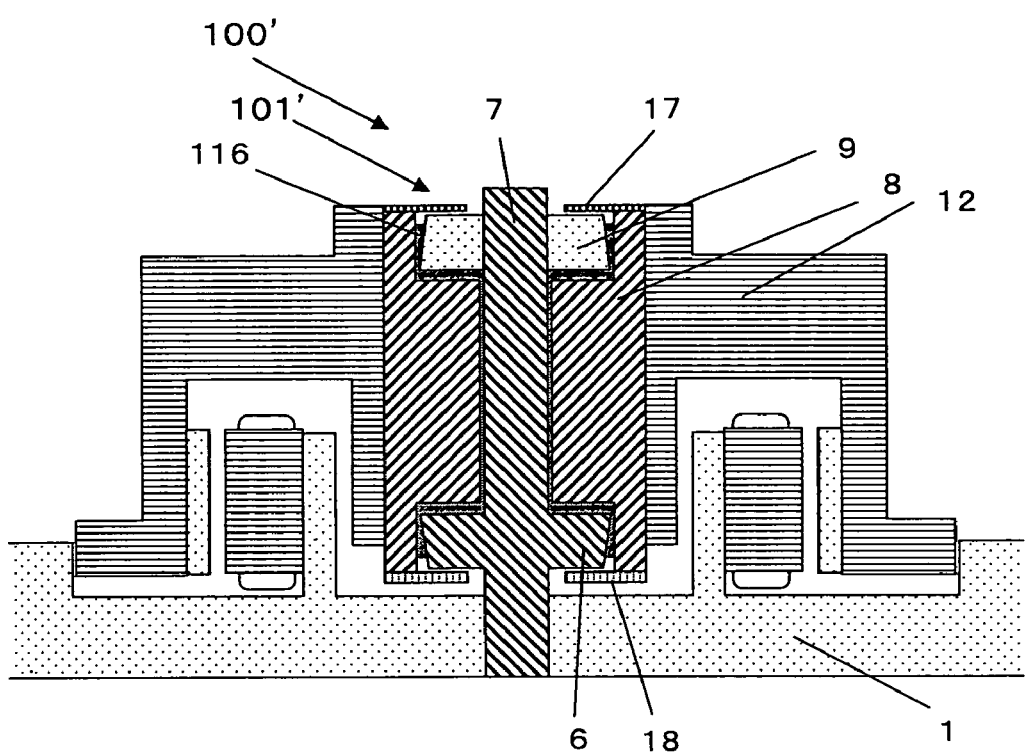
FIG. 7 is a diagram of the structure of a spindle motor in another embodiment of the present invention.

(D) In the above Embodiment 1 and the above (A) through (C), the bearing unit 101 pertaining to the present invention was described, but the present invention is not limited to this. For instance, a bearing unit 101' equipped with a spindle motor 100' may be configured as shown in FIG. 7. Specifically, the bearing unit 101' comprises at least the shaft 7, the sleeve 8 that is attached in a state of being rotatable relative to the shaft 7, the first flange unit 6 that is fixed to or integrated with the shaft 7, and the second flange unit 9 that is fixed to the shaft 7, and further has a first sealing unit 18 fixed to the sleeve 8 so as to cover the bottom face of the first flange unit 6 in the axial direction, and/or a second sealing unit 17 fixed to the sleeve 8 so as to cover the top face of the second flange unit 9 in the axial direction.

The lubricating fluid 116 is injected into the gaps between the flange units 6 and 9 and the sleeve 8. Foreign matter can find its way into these gaps from the bottom face in the axial direction, or the lubricating fluid 116 can leak out from these gaps. Foreign matter may also find its way in from the top face. As a result, the smooth operation of the bearing unit 101 is impeded.

Also, the sleeve 8 and the first flange unit 6 are usually disposed near the base plate 1, with a specific gap provided between them and the base plate 1. The distance of this gap is tiny in order to prevent contamination by foreign matter from the bottom face in the axial direction and leakage of the lubricating fluid 116. Consequently, high precision is required in the manufacture of a spindle motor, and this limits the freedom of design of the spindle motor.

In view of this, the sleeve 8 is fixed by disposing the sealing units 17 and 18 so as to cover the faces of the flange units 6 and 9, respectively, in the axial direction in order to seal the gap between the flange units 6 and 9 and the sleeve 8. As long as the above-mentioned gap can be sealed, the sealing units 17 and 18 may be disposed so as to span at least the outer peripheral sides of the faces of the flange units in the axial direction. Here, the sealing units 17 and 18 may be fixed to the sleeve 8 with an adhesive or the like.

Using a structure such as this no only suppresses the admixture of foreign matter and the leakage of the lubricating fluid 116, but also means that the bearing unit 101' does not necessarily have to be disposed near the base plate 1, which affords greater design freedom.

This yields a bearing unit 101' with better operating performance.

(E) In Embodiment 1 above, an example of using the spherical jig 10 to press on the shaft 7 directly was described, but the present invention is not limited to this method. For example, the shaft 7 may be pressed via another unit such as a piece of hard rubber material.

This allows a bearing unit 101 to be manufactured with good precision.

Figure 8:
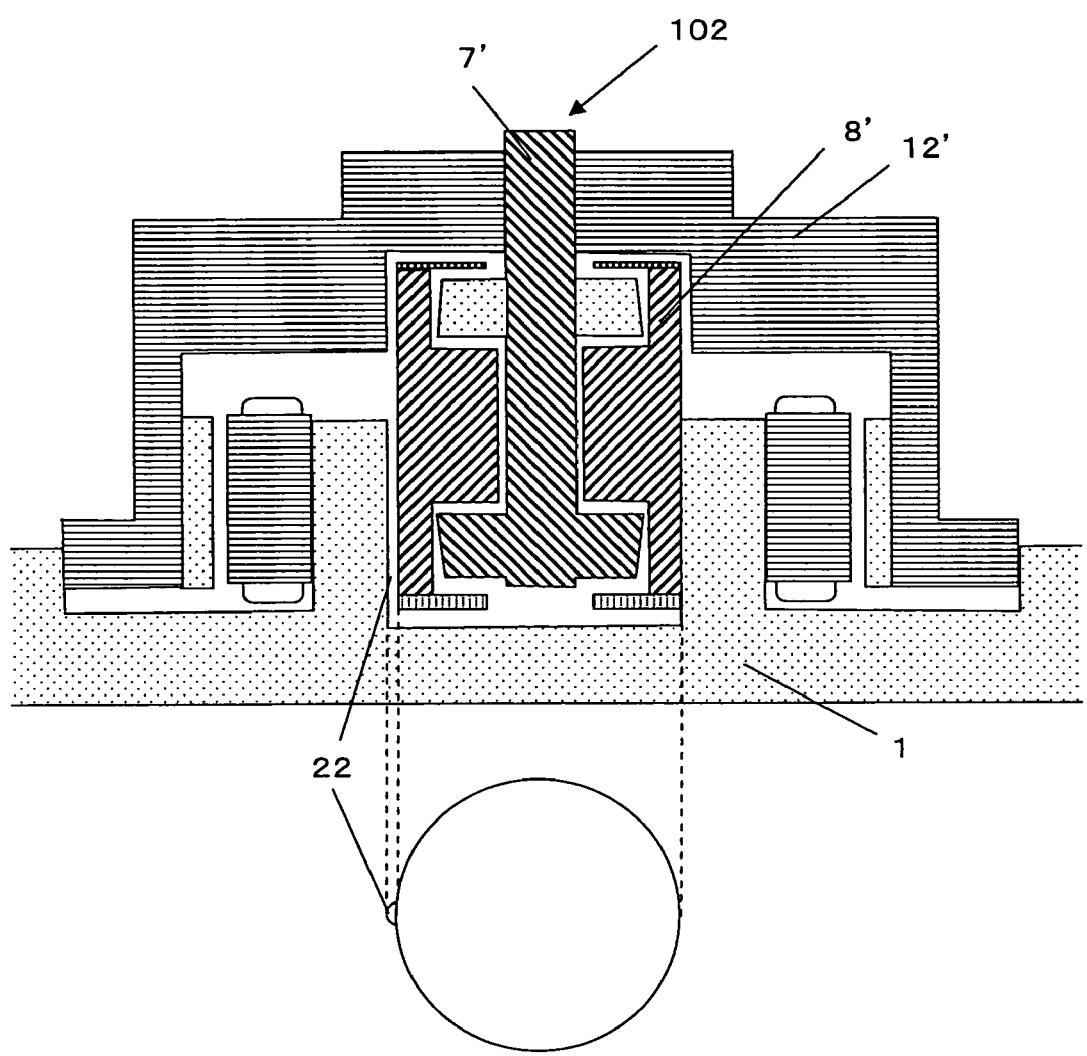
FIG. 8 is a diagram of the structure of a spindle motor in another embodiment of the present invention.
Figure 9:
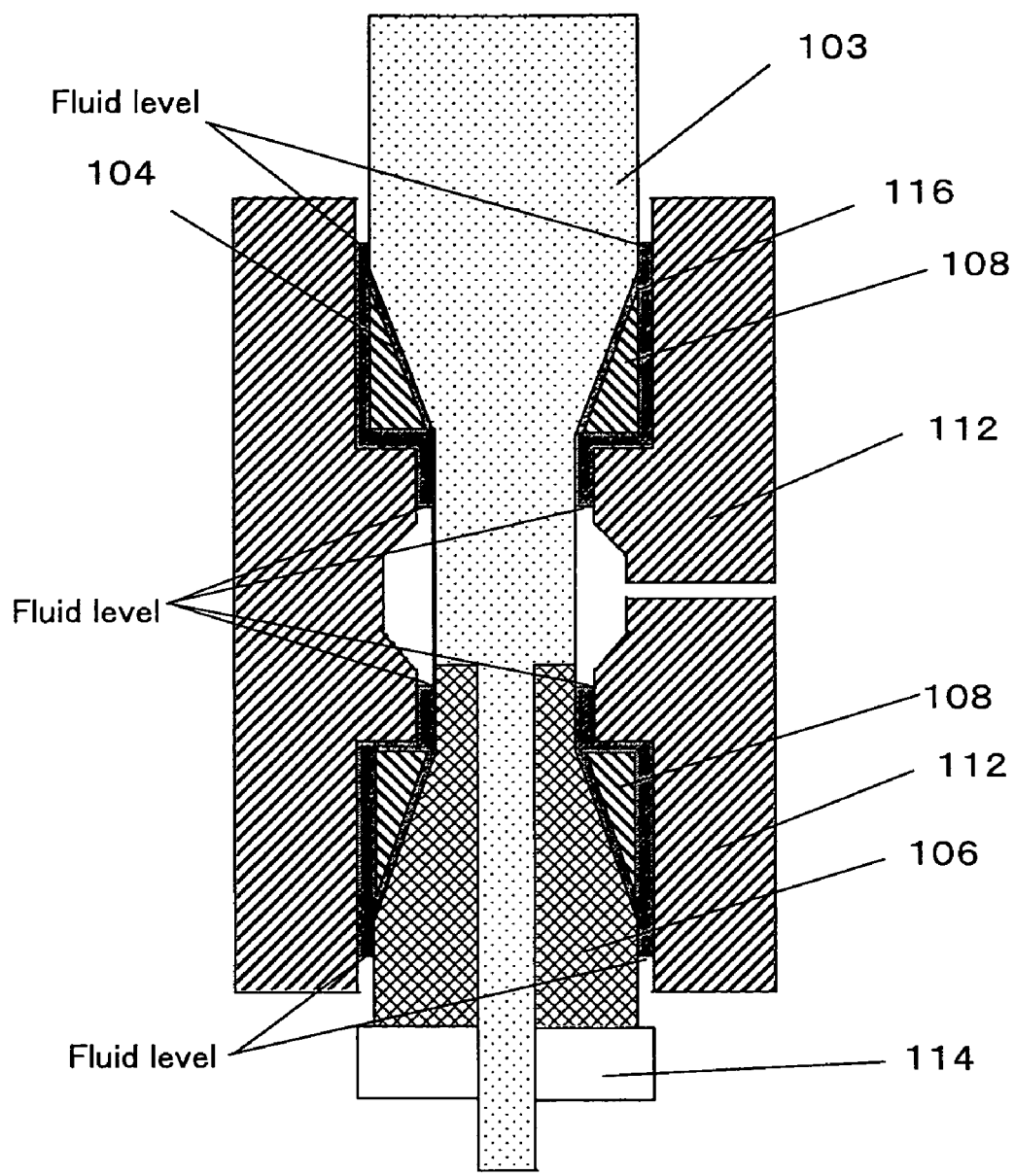
FIG. 9 is a diagram of the structure of a conventional hydrodynamic bearing.

(F) In Embodiment 1 above and in the above (A) through (E), an example in which the shaft 7 was a stationary unit was described, but the present invention is not limited to this constitution. For example, as shown in FIG. 8, the present invention may be applied to what is known as a shaft rotation type of bearing unit 102, in which a shaft 7' is a rotating unit and a sleeve 8' is a stationary unit.

In this bearing unit 102, a hub 12' is affixed to the shaft 7' and rotates integrally with the shaft 7'. The sleeve 8' is press-fitted and adhesively bonded to the concave part of the base plate 1, and thereby fixed to the base plate 1. Here, a ventilation hole 22 as shown in FIG. 8 is preferably formed between the base plate 1 and the sleeve 8'. The role of the ventilation hole 22 is to prevent the lubricating fluid from leaking out by means of air that has nowhere to go when the gap between the bearing unit 102 and the base plate 1 is sealed. The rest of the units are constituted the same as in the above Embodiment 1 or any of the above (A) through (E).

This again has the same effect as the above Embodiment 1 or any of the above (A) through (E).

Figure 16A:
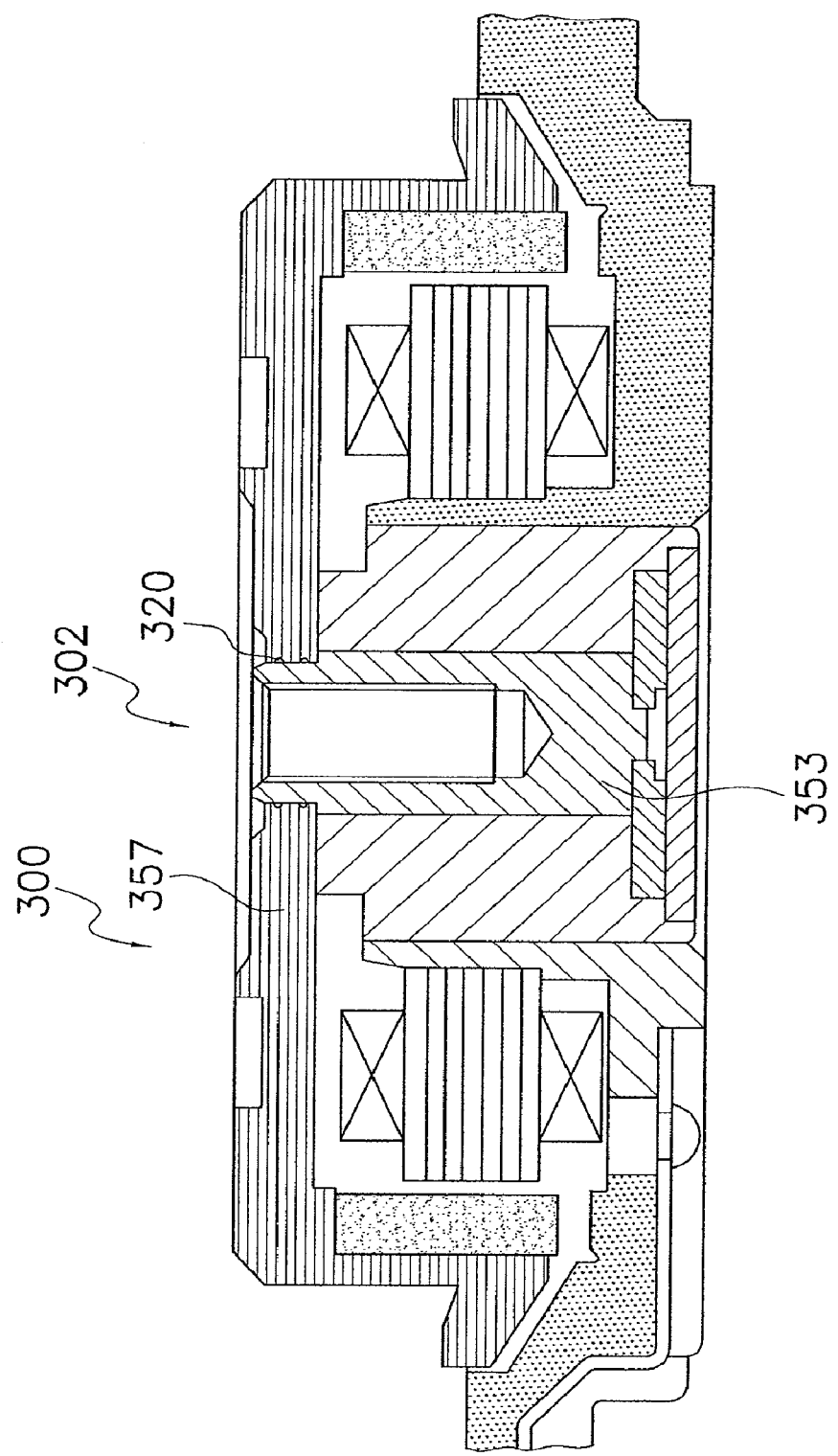
FIG. 16A is a diagram of an example of a further structure of a spindle motor of the present invention.
Figure 16B:
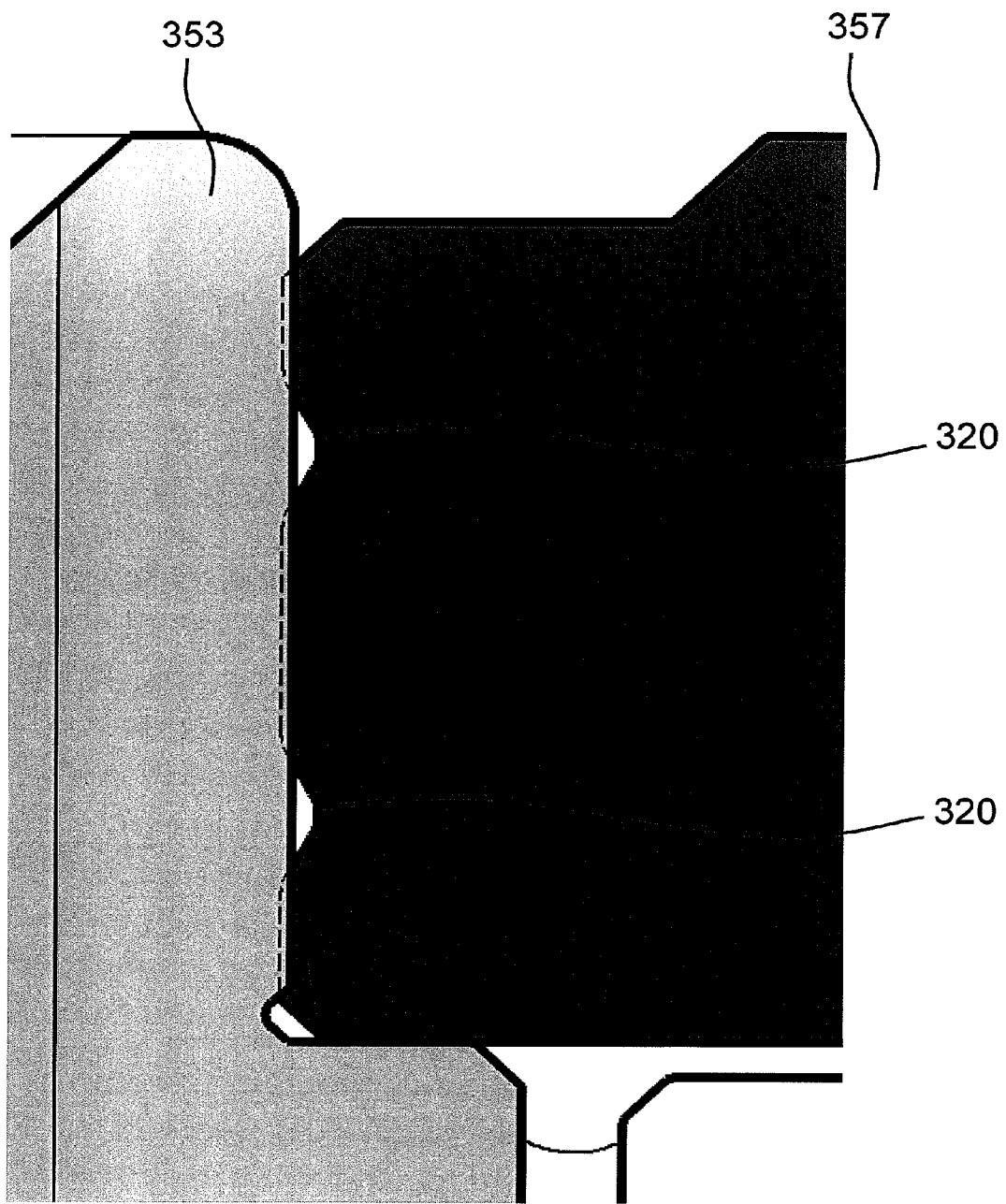
FIG. 16B is an enlarged view of an area of FIG. 16a illustrating the shaft press-fitted into the hub.

Also, according to the spindle motor of the present invention, the spindle motor may have a structure having a circular groove to prevent a lubricating fluid from leaching. In particular, as shown in FIGS. 16A and 16B, the circular groove 320 is formed at a joint portion between the shaft 353 and the hub 357 of the shaft 353 side of the spindle motor 300.

Ordinarily, when the laser welding is used for manufacturing the spindle motor 300, the shaft 353 and the hub 357 are jointed together by only press-fitting. However, only press-fitting cause a problem that a leaching of the lubricating fluid (not shown) in a bearing unit 302.

In view of this, at the joint portion of the shaft 353 and the hub 357, the circular groove 320 is formed to prevent the lubricant fluid from leaching and to make the lubricant fluid remain in the circular groove 320.

This yields a spindle motor 300 with better operating performance.

The circular groove 320 may be formed at the hub 357 side.

The present invention can be applied to any motor having a hydrodynamic bearing, such as a spindle motor. Furthermore, the present invention can be applied to spindle motors of the type that are open at both ends and have a fixed shaft, which are used in recording medium control devices having a plurality of disks.

What is claimed is:

1. A spindle motor, comprising:
   a housing;
   a shaft having an outer peripheral face;
   a sleeve fixed to the housing and rotatably supporting the shaft;
   a hub having a surface, a hole in which the shaft is press-fitted, a concave part having an inner periphery and being recessed from the surface of the hub in an end region of the hole, and an inside-chamfered portion provided to the inner periphery of the concave part;
   a valley-shaped concave portion formed by the outer peripheral face of the shaft press-fitted into the hole of the hub and the inside-chamfered portion of the hub;
   a welded portion formed in one of the valley-shaped concave portion and both the valley-shaped concave portion and the concave part of the hub;
   an adhesive resin coated on the welded portion;
   a stator coil attached to the housing; and
   a rotor magnet fixed to the hub and being across from the stator coil attached to the housing to which the sleeve is fixed.

2. A spindle motor according to claim 1, further comprising, a circular groove formed in the shaft or the hub at a joint of the shaft and the hub.

3. A spindle motor according to claim 1, wherein the welded portion is formed in both the valley-shaped concave portion and the concave part of the hub.

4. A spindle motor according to claim 1, wherein the valley-shaped concave portion and the concave part of the hub are configured so as to prevent welding fume dispersion.

* * * * *